United States Patent
Zhu et al.

(10) Patent No.: US 12,507,219 B2
(45) Date of Patent: Dec. 23, 2025

(54) DATA TRANSMISSION METHOD, COMMUNICATION DEVICE, AND STORAGE MEDIUM

(71) Applicant: SHENZHEN TRANSSION HOLDINGS CO., LTD., Guangdong (CN)

(72) Inventors: Rongchang Zhu, Guangdong (CN); Wei Huang, Guangdong (CN); Junwei Huang, Guangdong (CN)

(73) Assignee: SHENZHEN TRANSSION HOLDINGS CO., LTD., Guangdong (CN)

( * ) Notice: Subject to any disclaimer, the term of this patent is extended or adjusted under 35 U.S.C. 154(b) by 0 days.

(21) Appl. No.: 18/862,963

(22) PCT Filed: Apr. 28, 2023

(86) PCT No.: PCT/CN2023/091865
§ 371 (c)(1),
(2) Date: Nov. 5, 2024

(87) PCT Pub. No.: WO2023/213257
PCT Pub. Date: Nov. 9, 2023

(65) Prior Publication Data
US 2025/0294531 A1  Sep. 18, 2025

(30) Foreign Application Priority Data
May 5, 2022 (CN) .................. 202210478249.8

(51) Int. Cl.
*H04W 72/232* (2023.01)
*H04W 72/0446* (2023.01)

(52) U.S. Cl.
CPC .............. *H04W 72/0446* (2013.01)

(58) Field of Classification Search
CPC .................................. H04W 72/0446
See application file for complete search history.

(56) References Cited

U.S. PATENT DOCUMENTS

| 2020/0100223 A1 | 3/2020 | Park et al. |
| 2021/0160866 A1 | 5/2021 | Zhang et al. |

(Continued)

FOREIGN PATENT DOCUMENTS

| CN | 113079709 | 7/2021 |
| CN | 113661752 | 11/2021 |

(Continued)

OTHER PUBLICATIONS

Ericsson, "FL summary#0 for physical layer control procedures for NTN", 3GPP TSG-RAN WG1 Meeting #98, R1-1909485, Aug. 26-30, 2019, pp. 1-8.

(Continued)

*Primary Examiner* — Melvin C Marcelo
(74) *Attorney, Agent, or Firm* — JCIPRNET

(57) ABSTRACT

The present application provides a data transmission method, a communication device, and a storage medium. The method includes: determining, according control information, a first slot offset and a second slot offset; sending, according to the first slot offset, feedback information, and performing, according to the second slot offset, a data transmission. The solution of the present application can be used to solve the problem of insufficient time for ACK/NACK and/or physical uplink service transmission caused by relaxed processing of physical downlink shared channel and/or physical uplink shared channel.

20 Claims, 7 Drawing Sheets

(56) References Cited

U.S. PATENT DOCUMENTS

| | | | |
|---|---|---|---|
| 2022/0030607 A1 | 1/2022 | Liu et al. | |
| 2022/0110148 A1 | 4/2022 | Oh et al. | |
| 2022/0321272 A1* | 10/2022 | Yoshioka | H04L 1/1854 |
| 2024/0154758 A1* | 5/2024 | Shi | H04L 5/0051 |

FOREIGN PATENT DOCUMENTS

| | | |
|---|---|---|
| CN | 113767583 | 12/2021 |
| CN | 114342505 | 4/2022 |
| CN | 114641077 | 6/2022 |
| EP | 3531778 | 8/2019 |
| WO | 2022027250 | 2/2022 |

OTHER PUBLICATIONS

3GPP, "Technical Specification; 3rd Generation Partnership Project; Technical Specification Group Radio Access Network; NR: Physical layer procedures for data(Release 15)", 3GPP TS 38.214 V15.14.0, Sep. 2021, pp. 1-5.

Ericsson, "FL summary#0 for physical layer control procedures for NTN", 3GPP TSG-RAN WG1 Meeting #98, R1-1909485, Aug. 26-30, 2019, pp. 1-8.

3GPP, "Technical Specification Group Radio Access Network; NR; Physical layer procedures for data", Technical Specification, Sep. 2021, pp. 1-5.

ZTE, "FL Summary #1 of Channel Structure for 2-step RACH", 3GPP TSG RAN WG1 #99, R1-1913265, Nov. 18-22, 2019, pp. 1-42.

"Office Action of China Counterpart Application", issued on Jun. 29, 2022, with English translation thereof, p. 1-p. 28.

"Office Action of China Counterpart Application", issued on Aug. 12, 2022, with English translation thereof, p. 1-p. 27.

"Office Action of China Counterpart Application", issued on Sep. 9, 2022, with English translation thereof, p. 1- p. 45.

"Notice of allowance of China Counterpart Application", issued on Dec. 20, 2022, with English translation thereof, p. 1-p. 8.

"International Search Report (Form PCT/ISA/210) of PCT/CN2023/091865," mailed on Jun. 13, 2023, with English translation thereof, pp. 1-6.

"Written Opinion of the International Searching Authority (Form PCT/ISA/237) of PCT/CN2023/091865," mailed on Jun. 13, 2023, with English translation thereof, pp. 1-8.

3Gpp, "3rd Generation Partnership Project; Technical Specification Group Radio Access Network; NR; Physical layer procedures for control (Release 16)" , 3GPP Standard; Technical Specification, 3GPP Ts 38.213 V16.4.0, Dec. 2020, pp. 1-181.

"Search Report of Europe Counterpart Application", issued on Jul. 23, 2025, pp. 1-9.

* cited by examiner

DATA TRANSMISSION METHOD, COMMUNICATION DEVICE, AND STORAGE MEDIUM

CROSS-REFERENCE TO RELATED APPLICATION

The present application is a National Stage of International Application No. PCT/CN2023/091865, filed on Apr. 28, 2023, which claims priority to Chinese Patent Application No. 202210478249.8, filed on May 5, 2022 to the China National Intellectual Property Administration, entitled "DATA TRANSMISSION METHOD, COMMUNICATION DEVICE, AND STORAGE MEDIUM". These applications are incorporated into the present application by reference in their entireties.

TECHNICAL FIELD

The present application relates to communication technology, and in particular, to a data transmission method, a communication device, and a storage medium.

BACKGROUND

In new radio (NR), processing time of UE (UE processing time) includes decoding time of a physical downlink shared channel (abbreviated as PDSCH) and preparation time of a physical uplink shared channel (abbreviated as PUSCH).

In the process of conceptualizing and implementing the present application, the inventor discovered at least following existing problems: if the PDSCH decoding time is extended, but time for a physical uplink control channel (abbreviated as PUCCH) to send a feedback of a receiving status of PDSCH is still determined according to the existing protocol, there may be scenarios where a reception of the PDSCH is not completed at the occasion of sending an acknowledgement (abbreviated as ACK) or a negative acknowledgement (abbreviated as NACK), resulting in an invalid ACK/NACK. Similarly, if preparation time of the physical uplink shared channel (PUSCH) is extended, and a slot offset between a slot where a physical downlink control channel (abbreviated as PDCCH) is located and a slot where the PUSCH scheduled by the PDCCH is located remains unchanged, there may be scenarios where a UE has not yet completed a preparation of the PUSCH but needs to transmit PUSCH data, which may result in an invalid PUSCH transmission.

The previous description is intended to provide general background information, and does not necessarily constitute a prior art.

SUMMARY

The present application provides a data transmission method, a communication device, and a storage medium, in order to solve above mentioned technical problems.

In a first aspect, the present application provides a data transmission method, including following steps:

S2, determining, according to control information, a second slot offset,
wherein the second slot offset comprises at least one of following:
a sum of a fifth specific slot offset corresponding to a time domain resource assignment field and a second pre-stored slot offset, wherein the second pre-stored slot offset is related to a subcarrier spacing, and the second pre-stored slot offset corresponding to a different subcarrier spacing is not exactly the same; or
a seventh specific slot offset in a specific table corresponding to the time domain resource assignment field, wherein a number of rows of the specific table is N, and each row of the specific table corresponds to a slot offset, a slot offset corresponding to a Mth row of the specific table is greater than a slot offset corresponding to any row of first 16 rows of the specific table; both N and M are integers greater than 16, and N is greater than or equal to M; and S3, performing, according to the second slot offset, a data transmission.

In a second aspect, the present application provides a data transmission method that can be applied in a terminal device (such as a mobile phone), including following steps:

S2, determining, according to control information, a first slot offset and a second slot offset;

S3, sending, according to the first slot offset, feedback information, and performing, according to the second slot offset, a data transmission.

Optionally, the method further includes at least one of the following:
the control information includes at least one of the following: first downlink control information used for scheduling a downlink transmission, second downlink control information used for scheduling an uplink transmission, or radio resource control information;
the first slot offset is a slot offset between a slot where a PDSCH is located and a slot where a PUCCH that carries feedback information corresponding to the PDSCH is located;
the second slot offset is a slot offset between a slot where a PDCCH is located and a slot where a PUSCH scheduled by the PDCCH is located;
the feedback information is carried on the PUCCH;
the data transmission is carried on the PUSCH.

Optionally, the method further includes at least one of the following:
the first downlink control information includes a PDSCH-to-HARQ_feedback timing indicator field, and/or, a device type indication field;
the second downlink control information includes a time domain resource assignment field.

Optionally, the method further includes at least one of the following:
a bit number corresponding to the PDSCH-to-HARQ_feedback timing indicator field is a positive integer greater than or equal to 3;
a bit number corresponding to the time domain resource assignment field is a positive integer greater than or equal to 4;
the device type indication field is used to specify a terminal type to which the first downlink control information applies;
any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, before the step S2, the method further includes:

S1, receiving the control information.

Optionally, the method further includes at least one of the following:
pre-storing a first slot offset table, where the first slot offset table includes at least one first pre-stored slot offset;
pre-storing a second slot offset table, where the second slot offset table includes at least one second pre-stored slot offset;
pre-storing a third slot offset table, where the third slot offset table includes at least one third pre-stored slot offset.

Optionally, the first slot offset includes at least one of the following:
a sum of a specific slot offset corresponding to a PDSCH-to-HARQ_feedback timing indicator field and the first pre-stored slot offset;
a specific slot offset corresponding to a PDSCH-to-HARQ_feedback timing indicator field;
the device type indication field and/or a specific slot offset corresponding to a PDSCH-to-HARQ_feedback timing indicator field in the first downlink control information;
a third slot offset in specific radio resource control information corresponding to a PDSCH-to-HARQ_feedback timing indicator field.

Optionally, the second slot offset includes at least one of the following:
a sum of a fifth specific slot offset corresponding to a time domain resource assignment field and the second pre-stored slot offset;
a sixth specific slot offset in a specific table corresponding to a time domain resource assignment field, where the sixth specific slot offset is related to the third pre-stored slot offset;
a seventh specific slot offset in a specific table corresponding to a time domain resource assignment field;
a fourth slot offset in specific radio resource control information corresponding to a time domain resource assignment field.

Optionally, sending, according to the first slot offset, feedback information, includes:
determining, according to the first slot offset, a first transmission occasion;
sending, according to the first transmission occasion, a PUCCH carrying ACK/NACK information.

Optionally, performing, according to the second slot offset, a data transmission, includes:
determining, according to the second slot offset, a second transmission occasion;
performing, according to the second transmission occasion, a PUSCH transmission.

In a third aspect, the present application provides a data transmission method that can be applied in a terminal device (such as a mobile phone), the method includes following steps:
S100, determining a preset parameter;
S200, according to the preset parameter, sending feedback information and performing a data transmission.

Optionally, the preset parameter includes at least one of the following:
a PDSCH-to-HARQ_feedback timing indicator field;
a device type indication field;
a time domain resource assignment field.

Optionally, a determination manner of the preset parameter includes:
determining, according to control information, the preset parameter.

Optionally, the control information includes at least one of the following:
first downlink control information used for scheduling a downlink transmission; second downlink control information used for scheduling an uplink transmission; radio resource control information.

Optionally, the method further includes at least one of the following:
the feedback information is carried on a PUCCH;
the data transmission is carried on a PUSCH.

Optionally, the step S200 includes:
determining, according to the preset parameter, a first slot offset and a second slot offset; sending, according to the first slot offset, the feedback information, and performing, according to the second slot offset, the data transmission.

Optionally, the method further includes at least one of the following:
the first slot offset is a slot offset between a slot where the PDSCH is located and a slot where the PUCCH that carries feedback information corresponding to the PDSCH is located;
the second slot offset is a slot offset between a slot where a PDCCH is located and a slot where a PUSCH that is scheduled by the PDCCH is located.

Sending, according to the first slot offset, the feedback information includes: determining, according to the first slot offset, a first transmission occasion;
sending, according to the first transmission occasion, a PUCCH carrying ACK/NACK information.

Performing, according to the second slot offset, the data transmission includes: determining, according to the second slot offset, a second transmission occasion;
performing, according to the second transmission occasion, a PUSCH transmission.

Optionally, the method further includes at least one of the following:
a bit number corresponding to the PDSCH-to-HARQ_feedback timing indicator field is a positive integer greater than or equal to 3;
a bit number corresponding to the time domain resource assignment field is a positive integer greater than or equal to 4;
the device type indication field is used to specify a terminal type to which the first downlink control information applies;
any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, the method further includes at least one of the following:
pre-storing a first slot offset table, where the first slot offset table includes at least one first pre-stored slot offset;
pre-storing a second slot offset table, where the second slot offset table includes at least one second pre-stored slot offset;
pre-storing a third slot offset table, where the third slot offset table includes at least one third pre-stored slot offset.

Optionally, the first slot offset includes at least one of the following:
- a sum of a specific slot offset corresponding to a PDSCH-to-HARQ_feedback timing indicator field and the first pre-stored slot offset;
- a specific slot offset corresponding to a PDSCH-to-HARQ_feedback timing indicator field;
- the device type indication field and/or a specific slot offset corresponding to a PDSCH-to-HARQ_feedback timing indicator field in the first downlink control information;
- a third slot offset in specific radio resource control information corresponding to a PDSCH-to-HARQ_feedback timing indicator field.

Optionally, the second slot offset includes at least one of the following:
- a sum of a fifth specific slot offset corresponding to a time domain resource assignment field and the second pre-stored slot offset;
- a sixth specific slot offset in a specific table corresponding to a time domain resource assignment field, where the sixth specific slot offset is related to the third pre-stored slot offset;
- a seventh specific slot offset in a specific table corresponding to a time domain resource assignment field;
- a fourth slot offset in specific radio resource control information corresponding to a time domain resource assignment field.

In a fourth aspect, the present application provides a data transmission method, where the method includes following steps:

S11, sending control information used for determining a second slot offset;

wherein the second slot offset comprises at least one of following:
- a sum of a fifth specific slot offset corresponding to a time domain resource assignment field and a second pre-stored slot offset, wherein the second pre-stored slot offset is related to a subcarrier spacing, and the second pre-stored slot offset corresponding to a different subcarrier spacing is not exactly the same; or
- a seventh specific slot offset in a specific table corresponding to the time domain resource assignment field, wherein a number of rows of the specific table is N, and each row of the specific table corresponds to a slot offset, a slot offset corresponding to a Mth row of the specific table is greater than a slot offset corresponding to any row of first 16 rows of the specific table; both N and M are integers greater than 16, and N is greater than or equal to M; and S12, receiving PUSCH, according to the-second slot offset.

In a fifth aspect, the present application provides a data transmission method that can be applied in a network device (such as a base station), the method includes following steps:

S11, sending control information used for determining a preset parameter;

S12, receiving PUSCH transmitted according to the preset parameter.

Optionally, the method further includes at least one of the following:
- the preset parameter includes a first slot offset and/or a second slot offset;
- the control information includes at least one of the following: first downlink control information used for scheduling a downlink transmission, second downlink control information used for scheduling an uplink transmission, or radio resource control information.

Optionally, the step S12 includes at least one of the following:
- receiving feedback information sent according to the first slot offset;
- receiving the data transmitted according to the second slot offset.

Optionally, the method further includes at least one of the following:
- the first slot offset is a slot offset between a slot where a PDSCH is located and a slot where a PUCCH that carries feedback information corresponding to the PDSCH is located;
- the second slot offset is a slot offset between a slot where a PDCCH is located and a slot where a PUSCH that is scheduled by the PDCCH is located;
- the feedback information is carried on the PUCCH;
- the data transmitted according to the second slot offset is carried on the PUSCH.

Optionally, the method further includes at least one of the following:
- the first downlink control information includes a PDSCH-to-HARQ_feedback timing indicator field, and/or, a device type indication field;
- the second downlink control information includes a time domain resource assignment field.

Optionally, the method further includes at least one of the following:
- a bit number corresponding to the PDSCH-to-HARQ_feedback timing indicator field is a positive integer greater than or equal to 3;
- a bit number corresponding to the time domain resource assignment field is a positive integer greater than or equal to 4;
- the device type indication field is used to specify a terminal type to which the first downlink control information applies;
- any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, the method further includes at least one of the following:
- the first slot offset includes at least one of the following: a sum of a specific slot offset corresponding to a PDSCH-to-HARQ_feedback timing indicator field and a first pre-stored slot offset, a specific slot offset corresponding to a PDSCH-to-HARQ_feedback timing indicator field, the device type indication field and/or a specific slot offset corresponding to a PDSCH-to-HARQ_feedback timing indicator field in the first downlink control information, a third slot offset in specific radio resource control information corresponding to a PDSCH-to-HARQ_feedback timing indicator field;
- the second slot offset includes at least one of the following: a sum of a fifth specific slot offset corresponding to a first time domain resource assignment field and a second pre-stored slot offset; a sixth specific slot offset in a specific table corresponding to a second time domain resource assignment field, where the sixth specific slot offset is related to a third pre-stored slot offset; a seventh specific slot offset in a specific table corresponding to a third time domain resource assignment field; a fourth slot offset in specific radio resource control information corresponding to a fourth time domain resource assignment field.

In a sixth aspect, the present application provides a data transmission apparatus including:
- a determination module, configured to determine, according to control information, a first slot offset and a second slot offset;
- a transmission module, configured to: send, according to the first slot offset, feedback information, and perform, according to the second slot offset, a data transmission.

In a seventh aspect, the present application provides a data transmission apparatus including:
- a determination module, configured to determine a preset parameter;
- a transmission module, configured to: according to the preset parameter, send feedback information and perform a data transmission.

In an eighth aspect, the present application provides a data transmission apparatus including:
- a transmission module, configured to send control information used for determining a preset parameter;
- a reception module, configured to receive data transmitted according to the preset parameter.

In a ninth aspect, the present application provides a communication device, including: a memory and a processor;
- the memory is configured to store program instructions;
- the processor is configured to call the program instructions in the memory to execute the data transmission method as described in any item of the first aspect to the fifth aspect.

In a tenth aspect, the present application provides a computer readable storage medium, where the computer readable storage medium stores a computer program, when the computer program is executed, the data transmission method as described in any item of the first aspect to the fifth aspect is implemented.

The present application provides the data transmission methods, the communication device, and the storage medium. A terminal device receives control information sent by a network device, and determines, according to the control information, a first slot offset used for sending a PUCCH for ACK/NACK and a second slot offset used for sending a PUSCH. With the determined first slot offset, an effective transmission of the feedback information in a scenario where PDSCH processing time is extended can be ensured, and with the determined second slot offset, an effective transmission of PUSCH in a scenario where preparation time of the PUSCH is extended can be ensured. The present application can effectively determine reasonable first slot offset and second slot offset by specific control information, so that the terminal completes a processing on the PDSCH when sending the feedback information, and/or completes a bandwidth switching and other preparation processing for sending the PUSCH when transmitting the PUSCH. In this way, the terminal device can be prevented from sending invalid feedback information, or, transmitting invalid data. The technical solution of the present application can effectively ensure the effective transmission of the feedback information and/or uplink data information.

BRIEF DESCRIPTION OF DRAWINGS

The drawings here are incorporated into the specification and form a part of this specification, showing embodiments in accordance with the present application, and are used together with the specification to explain the principles of the present application. In order to illustrate the technical solution of the embodiments of the present application more clearly, the drawings that need to be used in the description of the embodiments will be briefly introduced in the following. Obviously, for those of ordinary skill in the art, other drawings can be obtained according to these drawings without paying any creative effort.

Figure 1:
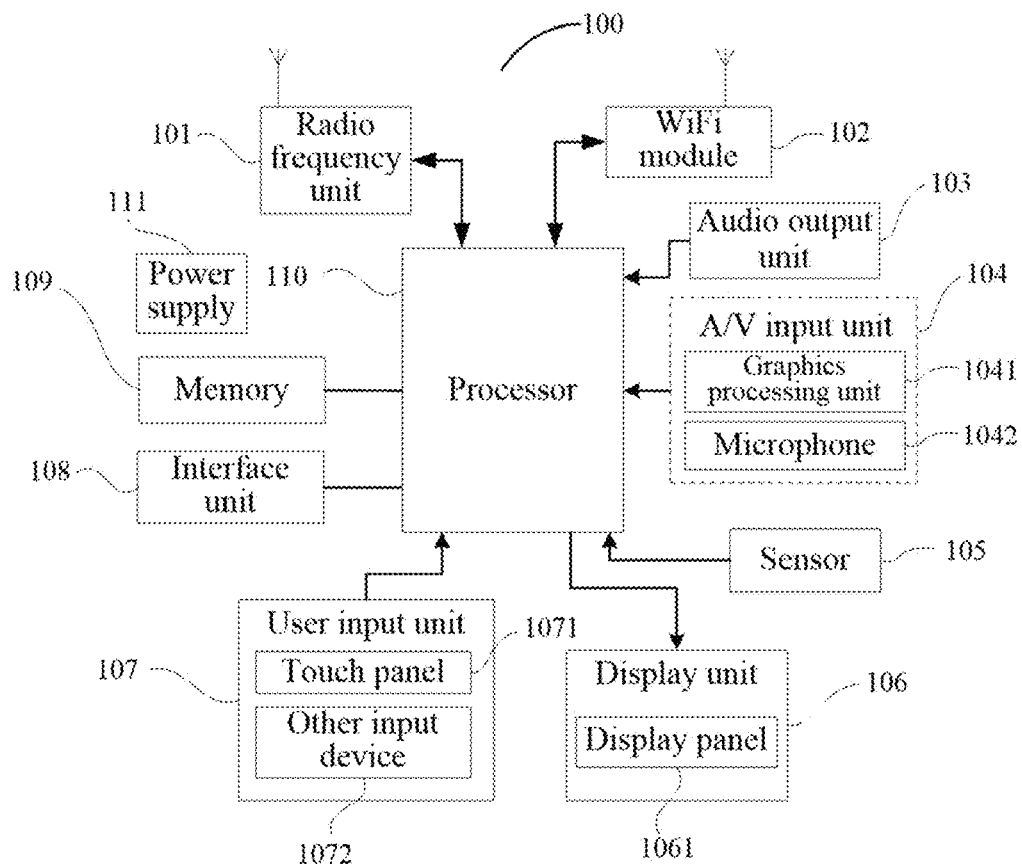
FIG. 1 is a schematic diagram of a hardware structure of a terminal device provided in an embodiment of the present application.

The implementation of the purpose, the functional features, and the advantages of the present application will be further explained in conjunction with the embodiments, with reference to the drawings. Through the above drawings, specific embodiments of the present application have been shown, and more detailed descriptions will be provided in the following text. These drawings and textual descriptions are not intended to limit the scope of the concept of the present application in any way, but rather to illustrate the concept of the present application to those skilled in the art with reference to the specific embodiments.

DESCRIPTION OF EMBODIMENTS

Here, a detailed explanation of exemplary embodiments will be given, which are illustrated in the drawings. When the following description relates to the drawings, unless otherwise indicated, the same numbers in different drawings represent the same or similar elements. The implementations described in the following exemplary embodiments do not represent all implementations consistent with the present application. On the contrary, they are only examples of apparatuses and methods that are consistent with some aspects of the present application and as described in detail in the attached claims.

It should be noted that herein, the terms "comprise", "include", or any other variant thereof are intended to cover non exclusive inclusion, so that a process, method, object, or apparatus that includes a series of elements not only includes those elements, but also other elements that are not explicitly listed, or also include elements inherent in such a process, method, object, or apparatus. Without further limitations, the element limited by the statement "including one . . . " does not exclude the existence of another identical element in the process, method, object, or apparatus including the element. In addition, components, features, and elements with the same name in different embodiments of the present application may have the same or different meanings, the specific meaning needs to be determined based on its interpretation in the specific embodiment or further combined with the context in the specific embodiment.

It should be understood that although the terms first, second, third, etc. may be used herein to describe various information, these information should not be limited to these terms. These terms are only used to distinguish the same type of information from each other. For example, without departing from the scope of this application, first information can also be referred to as second information, and similarly, the second information can also be referred to as the first information. Depending on the context, the word "if" used here can be interpreted as "at the time of . . . " or "when . . . " or "in response to a determination of . . . ". Furthermore, as used herein, the singular forms "a", "one", and "the" are intended to also include the plural form, unless the context indicates otherwise. It should be further understood that the terms "include" and "comprise" indicate the existence of the described features, steps, operations, elements, components, items, types, and/or, groups, but do not exclude the existence, appearance, or addition of one or more other features, steps, operations, elements, components, items, types, and/or, groups. The terms "or", "and/or", "including at least one of the following" used in the present application may be interpreted as inclusive, or imply any one or any combination. For example, "including at least one of the following: A, B, C" means "any of the following: A; B; C; A and B; A and C; B and C; A and B and C"; and for another example, "A, B or C" or "A, B and/or C" means "any of the following: A; B; C; A and B; A and C; B and C; A and B and C". Exceptions to this definition only occur when combinations of elements, functions, steps, or operations are inherently mutually exclusive in certain ways.

It should be understood that although various steps in the flowchart in embodiments of the present application are sequentially displayed according to arrow instructions, these steps are not necessarily executed in the order indicated by the arrow. Unless explicitly stated herein, there is no strict order limit for the execution of these steps, which can be executed in other order. Moreover, at least a portion of the steps in the drawings may include multiple sub-steps or stages, these sub-steps or stages may not necessarily be completed at the same occasion, but may be executed at different occasions, and their execution order may not necessarily be sequential, but may rotate or alternate with at least a portion of other steps or sub-steps of other steps or stages.

Depending on the context, the words "if" and "in case" used here can be interpreted as "at the time of . . . " or "when . . . " or "in response to a determination of . . . " or "in response to a detection of . . . ". Similarly, depending on the context, the phrases "if it is determined . . . " or "if it is detected (a stated condition or event)" can be interpreted as "when it is determined . . . " or "in response to a determination of . . . ", or "when it is detected (stated condition or event)" or "in response to a detection of (stated condition or event)".

It should be noted that, in this disclosure, step symbols such as S1 and S2 are used for the purpose of expressing the corresponding content more clearly and concisely, and do not constitute substantive limitations in order. Those skilled in the art may execute S2 first and then execute S1, but these should be within the scope of protection of the present application.

It should be understood that the specific embodiments described here are only used to explain the present application and are not intended to limit it.

In subsequent descriptions, suffixes such as "module", "component", or "unit" used to represent elements are only used for the purpose of facilitating the explanation of the present application and have no specific meaning in themselves. Therefore, "module", "component", or "unit" can be used in a mixed manner.

A communication device in the present application may be a terminal device (such as a mobile phone), may also be a network device (such as a base station), and what it specifically refers to needs to be determined in conjunction with the context.

The terminal device can be implemented in various forms. For example, the terminal device described in the present application may include a smart terminal such as a mobile phone, a tablet, a laptop, a handheld computer, a personal digital assistant (PDA), a portable media player (PMP), a navigation apparatus, a wearable device, a smart wristband, a pedometer, and a fixed terminal such as a digital TV and a desktop computer.

Those skilled in the art will understand that, in addition to elements specifically used for mobile purposes, the construction according to the embodiments of the present application can also be applied to fixed types of terminals.

Please refer to FIG. 1, it is a schematic diagram of a hardware structure of a terminal device of various embodiments of the present application. Terminal device 100 may include: a RF (Radio Frequency, radio frequency) unit 101, a WiFi module 102, an audio output unit 103, an A/V (audio/video) input unit 104, a sensor 105, a display unit 106, a user input unit 107, an interface unit 108, a memory 109, a processor 110, and a power supply 111 and other components. Those skilled in the art can understand that the structure of the terminal device shown in FIG. 1 does not constitute a limitation on the terminal device. The terminal device may include more or fewer components than shown in the figure, or may combine certain components, or may include different component arrangements.

The following is a specific introduction to various components of the terminal device in conjunction with FIG. 1.

Radio frequency unit 101 can be used for transmitting and receiving information, or a reception and transmission of a signal during a call, optionally, receiving downlink information from a base station and then providing it to processor 110 for processing; additionally, sending uplink data to the base station. Typically, radio frequency unit 101 includes but is not limited to an antenna, at least one amplifier, a transceiver, a coupler, a low noise amplifier, a duplexer, etc. In addition, radio frequency unit 101 can also communicate with the network and other devices through a wireless communication. The above wireless communication can use any communication standard or protocol, including but not limited to GSM (Global System of Mobile communication), GPRS (General Packet Radio Service), CDMA2000 (Code Division Multiple Access 2000), WCDMA (Wideband Code Division Multiple Access), TD-SCDMA (Time Division-Synchronous Code Division Multiple Access), FDD-LTE (Frequency Division Duplexing-Long Term Evolution), TDD-LTE (Time Division Duplexing-Long Term Evolution), and 5G, etc.

WiFi belongs to a close distance transmission technology. The terminal device can help users send and receive emails, browse web pages, and access streaming media, etc. through WiFi module 102 which provides users with wireless broadband internet access. Although FIG. 1 shows WiFi module 102, it can be understood that, it is not a necessary component of the terminal device and can be omitted as needed within the scope of not changing the essence of the disclosure.

Audio output unit 103 can convert audio data received by radio frequency unit 101 or WiFi module 102 or stored in memory 109 into an audio signal and output it as sound when terminal device 100 is in a call signal reception mode, a call mode, a recording mode, a voice recognition mode, a broadcast reception mode, etc. Moreover, audio output unit 103 can also provide audio output related to specific functions performed by terminal device 100 (such as call signal reception sound, message reception sound, etc.). Audio output unit 103 can include speakers, buzzers, and the like.

A/V input unit 104 is configured to receive an audio or video signals. A/V input unit 104 may include graphics processing unit (GPU) 1041 and microphone 1042. Graphics processing unit 1041 processes image data of a still image or a video obtained by an image capture apparatus (such as a camera) in video capture mode or image capture mode. The processed image frame can be displayed on display unit 106. The processed image frame processed by graphics processing unit 1041 can be stored in memory 109 (or other storage medium) or be transmitted through radio frequency unit 101 or WiFi module 102. Microphone 1042 can receive sound (audio data) through microphone 1042 in phone call mode, recording mode, voice recognition mode, and other operating modes, and can process such sound into audio data. The processed audio (voice) data can be converted into a format that can be sent to a mobile communication base station through radio frequency unit 101 for output in phone call mode. Microphone 1042 can implement various types of noise cancellation (or suppression) algorithms to eliminate (or suppress) noise or interference generated during the reception and transmission of audio signals.

Terminal device 100 also includes at least one sensor 105, such as a light sensor, a motion sensor, and other sensors. Optionally, the light sensor includes an ambient light sensor and a proximity sensor. Optionally, the ambient light sensor can adjust brightness of display panel 1061 based on brightness of ambient light. The proximity sensor can turn off display panel 1061 and/or backlight when terminal device 100 is moved to an ear. As a type of motion sensor, an accelerometer sensor can detect the magnitude of acceleration in various directions (usually three axes), and can detect the magnitude and direction of gravity when stationary, can be used for recognition of mobile phone posture application (such as horizontal and vertical screen switching, related games, magnetometer posture calibration), vibration recognition related functions (such as a pedometer, tapping), etc. As for other sensors that can be configured on mobile phones, such as a fingerprint sensor, a pressure sensor, an iris sensor, a molecular sensor, a gyroscope, a barometer, a hygrometer, a thermometer, an infrared sensor, etc., which will not be repeated in detail here.

Display unit 106 is configured to display information input by the user or provided to the user. Display unit 106 can include display panel 1061. Display panel 1061 can be configured in the form of liquid crystal display (LCD), organic light-emitting diode (OLED), etc.

User input unit 107 can be configured to receive input numerical or character information, as well as generate key signal inputs related to user settings and functional control of the terminal device. Optionally, user input unit 107 may include touch panel 1071 and an other input device 1072. Touch panel 1071, also known as the touch screen, can collect touch operations by the user on or near it (such as using any suitable object or accessory such as fingers, stylus, etc. to operate on touch panel 1071 or near touch panel 1071), and drive a corresponding connection device according to a predetermined program. Touch panel 1071 can include two parts: a touch detection apparatus and a touch controller. Optionally, the touch detection apparatus detects a touch orientation of the user and detects a signal brought by a touch operation, and transmits the signal to the touch controller; the touch controller receives touch information from the touch detection apparatus, converts it into contact coordinates, and sends them to processor 110, and can also receive commands from processor 110 and execute them. In addition, various types such as resistive, capacitive, infrared, and surface acoustic waves can be used to implement touch panel 1071. In addition to touch panel 1071, user input unit 107 can also include the other input device 1072. Optionally, the other input device 1072 may include but are not limited to one or more of a physical keyboard, a function key (such as a volume control button, a switch button, etc.), a trackball, a mouse, a joystick, etc., which are not limited here.

Optionally, touch panel 1071 can cover display panel 1061, and when touch operation on or near touch panel 1071 is detected by touch panel 1071, it is transmitted to processor 110 to determine a type of the touch event. Subsequently, processor 110 provides corresponding visual output on display panel 1061 according to the type of touch event. Although in FIG. 1, touch panel 1071 and display panel 1061 are two separated components to implement the input and output functions of the terminal device, in some embodiments, touch panel 1071 can be integrated with display panel 1061 to implement the input and output functions of the terminal device, which are not limited here.

The interface unit 108 serves as an interface through which at least one external apparatus can be connected to terminal device 100. For example, an external apparatus can include a wired or wireless headphone port, an external power supply (or battery charger) port, a wired or wireless data port, a memory card port, a port for connecting an apparatus with a recognition module, an audio input/output (I/O) port, a video I/O port, a headphone port, etc. Interface unit 108 can be configured to receive input from an external apparatus (such as data information, power, etc.) and transmit the received input to one or more elements within terminal device 100 or can be used to transmit data between terminal device 100 and the external apparatus.

Memory 109 can be configured to store software programs and various data. Memory 109 may mainly include a program storing area and a data storing area. Optionally, the program storing area may store an operating system, at least one application program required by functions (such as a sound playback function, an image playback function, etc.), etc.; the data storing area can store data created according to the use of the mobile phone (such as audio data, a phone book, etc.). In addition, memory 109 may include high-speed random access memory, as well as non volatile memory, such as at least one disk storage device, flash memory device, or other volatile solid-state storage device.

Processor 110 is a control center of the terminal device, which connects various parts of the entire terminal device through various interfaces and lines. By running or executing the software programs and/or modules stored in memory 109, as well as calling data stored in memory 109 to execute various functions of the terminal device and process data, thereby monitoring the terminal device as a whole. Processor 110 may include one or more processing units; in an embodiment, processor 110 can integrate an application processor and a modulation and demodulation processor; optionally, the application processor mainly processes an operating system, a user interface, and an application program, while the modulation and demodulation processor mainly processes wireless communication. It can be understood that the above modulation and demodulation processor may not be integrated into processor 110.

Terminal device 100 may also include power supply 111 (such as a battery) that powers various components. In an embodiment, power supply 111 can be logically connected to processor 110 through a power management system, thereby achieving functions such as management of charging, discharging, and power consumption management through the power management system.

Although not shown in FIG. 1, terminal device 100 may also include a Bluetooth module, etc., which will not be repeated in detail here.

In order to facilitate the understanding of the embodiments of the present application, a communication network system on which the terminal device of the present application is based will be described below.

Figure 2:
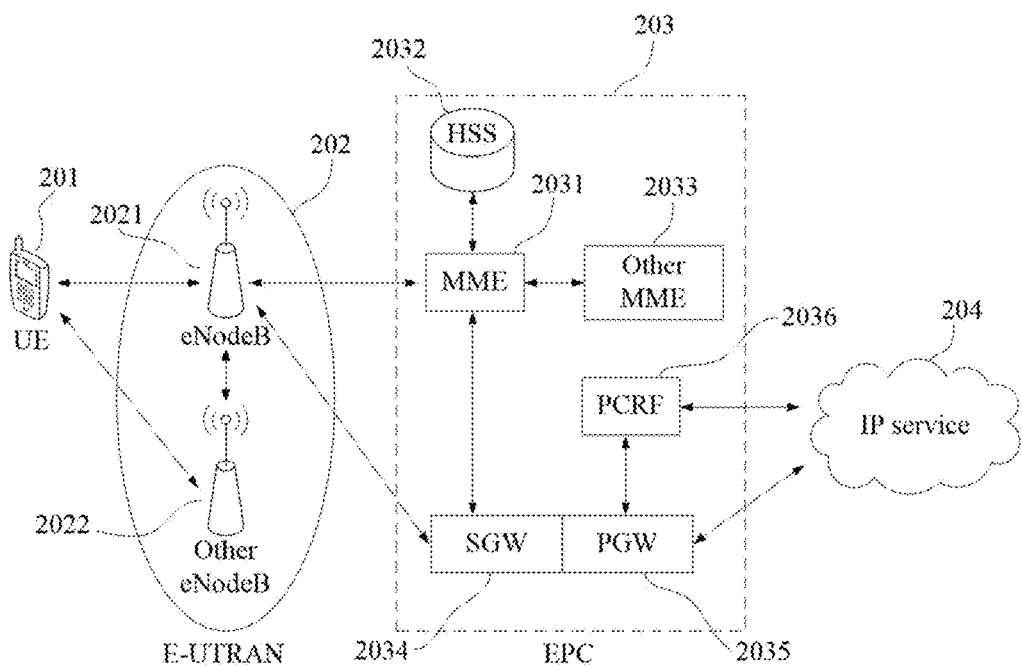
FIG. 2 is an architecture diagram of a communication network system provided in an embodiment of the present application.

Please refer to FIG. 2. FIG. 2 is an architecture diagram of a communication network system provided in an embodiment of the present application. The communication network system is an LTE system of universal mobile communication technology. The LTE system includes UE (User Equipment) 201, E-UTRAN (Evolved UMTS Terrestrial Radio Access Network) 202, EPC (Evolved Packet Core) 203, and IP service 204 of the operator which are communicatively connected in sequence.

Optionally, UE 201 may be the above terminal device 100, which will not be repeated in detail here.

E-UTRAN 202 includes eNodeB 2021 and other eNodeB 2022. Optionally, eNodeB 2021 can be connected to other eNodeB 2022 through backhaul (such as X2 interface), eNodeB 2021 is connected to EPC 203, and eNodeB 2021 can provide access from UE 201 to EPC 203.

EPC 203 can include MME (Mobility Management Entity) 2031, HSS (Home Subscriber Server) 2032, other MME 2033, SGW (Serving Gate Way) 2034, PGW (PDN Gate Way, Packet Data Network Gate way) 2035, PCRF (Policy and Charging Rules Function) 2036, etc. Optionally, MME 2031 is a control node that handles signaling between UE 201 and EPC 203, and provides bearer and connection management. HSS 2032 is configured to provide some registers to manage functions such as home location registers (not shown in the figure), and to store user specific information such as related to service characteristics and data rates. All user data can be sent through SGW 2034, PGW 2035 can provide IP address allocation and other functions of UE 201, and PCRF 2036 is a policy and charging control policy decision point for service data flow and IP bearer resources, and selects and provides available policy and charging control decisions for a policy and charging execution functional unit (not shown in the figure).

IP service 204 may include the Internet, intranet, IMS (IP Multimedia Subsystem), or other IP services.

Although the LTE system has been introduced as an example, those skilled in the art should be aware that the present application is not only applicable to the LTE system, but also to other wireless communication systems, such as GSM, CDMA2000, WCDMA, TD-SCDMA, and future new network systems (such as 5G), which is not limited here.

Figure 3A:
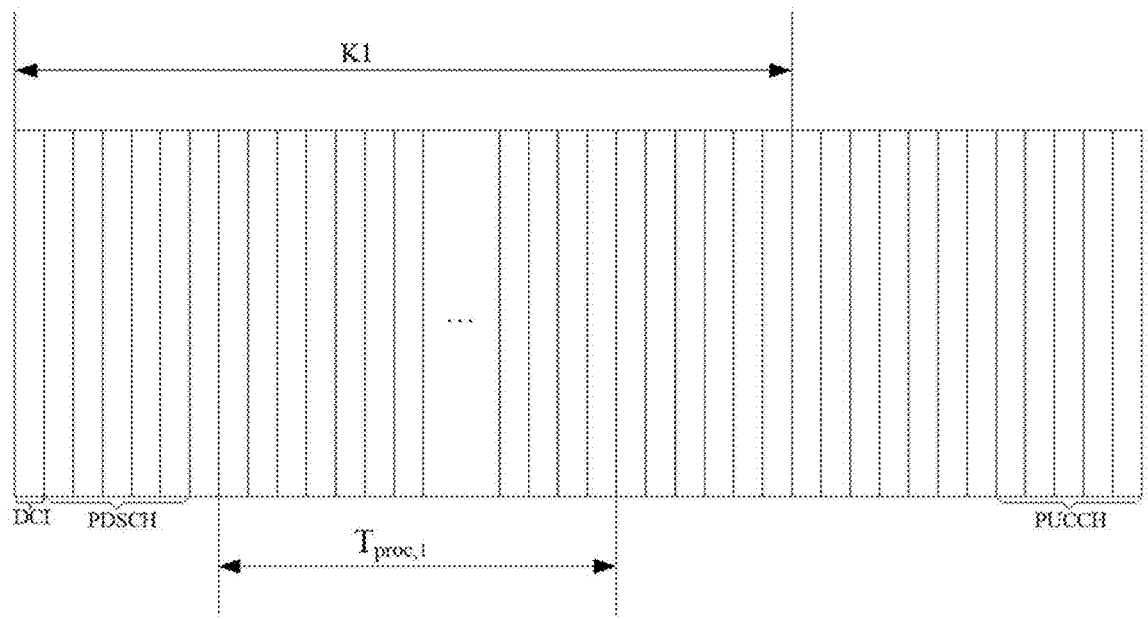
FIG. 3A is a schematic diagram of a slot based on PDSCH processing time provided in an embodiment of the present application.

FIG. 3A is a schematic diagram of a slot based on PDSCH processing time provided in an embodiment of the present application. $T_{proc,1}=(N_1+d_{1,1}+d_2)(2048+144) \cdot K2^{-\mu} \cdot T_c + T_{ext}$ is used to represent PDSCH processing time, where $N_1$ represents PDSCH decoding time. Let K1 represents a slot offset between a slot where the PDSCH is located and a slot where a PUCCH that carries ACK/NACK information of the PDSCH is located. It can be understood that, if the PDSCH is received at slot n, the PUCCH that carries ACK/NACK information of the PDSCH needs to be sent at slot n+K1. For reduced capacity equipment, such as Redcap UE, due to its low requirements in latency, the PDSCH decoding time $N_1$ of Redcap UE can be relaxed. In this scenario, if ACK/NACK is performed according to the scheduling specified by the existing protocol, there may be a problem that the PDSCH decoding is still in progress, but the terminal is required to send PUCCH that carries ACK/NACK of the PDSCH, i.e. there is a scenario where ACK/NACK is invalid.

Figure 3B:
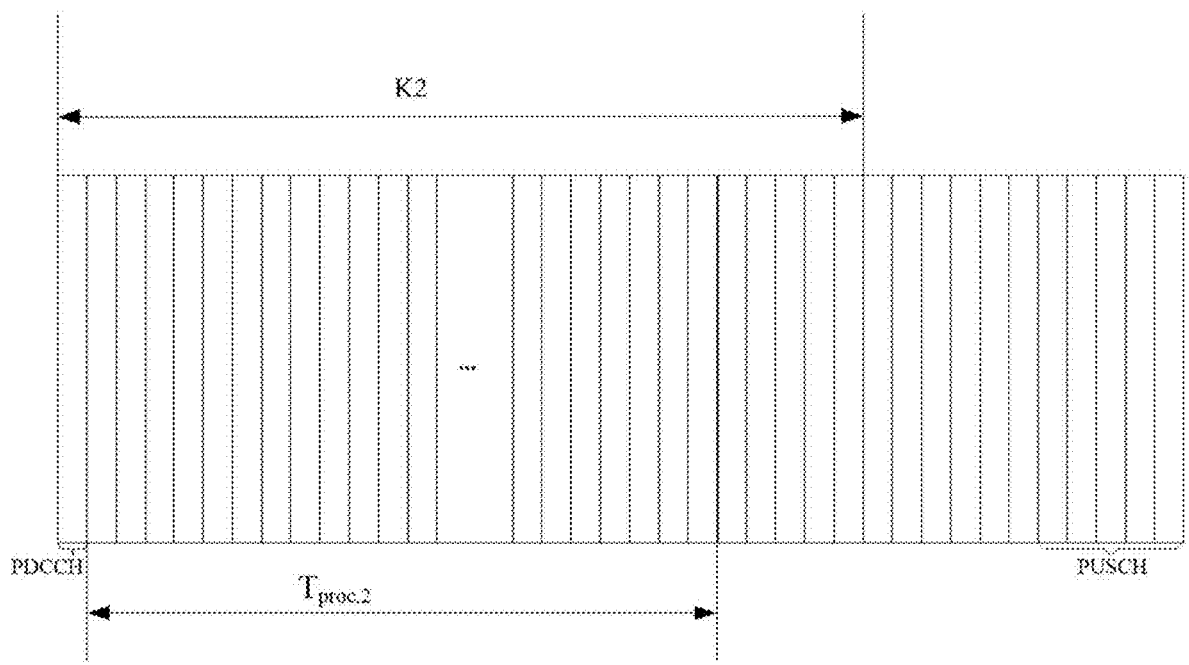
FIG. 3B is a schematic diagram of a slot based on PUSCH preparation time provided in an embodiment of the present application.

FIG. 3B is a schematic diagram of a slot based on PUSCH preparation time provided in an embodiment of the present application. When the PUSCH is scheduled by downlink control information (abbreviated as DCI), $T_{proc,2}=\max((N_2+d_{2,1}+d_2)(2048+144) \cdot K2^{-\mu} \cdot T_c + T_{ext} + T_{switch}, d_{2,2})$ is used to represent the processing time between PUSCH and PDCCH carrying UL grant, where, $N_2$ represents the PUSCH preparation time related to UE capability. Let K2 represents an offset between a slot where the PDCCH is located and a slot where the PUSCH scheduled by the PDCCH is located. It can be understood that, if the downlink control information (abbreviated as DCI) for uplink scheduling is received at slot n, the PUSCH needs to be sent at slot n+K2. For reduced capacity equipment, such as Redcap UE, due to its low requirements in latency, the PUSCH preparation time of Redcap UE can be relaxed, i.e. the PUSCH preparation time $N_2$ can be extended. In this scenario, if PUSCH is transmitted according to the existing protocol, there may be scenarios where PUSCH transmission is carried out while bandwidth is being switched or other services are in progress, making it impossible to transmit PUSCH and resulting in invalid PUSCH transmission.

Optionally, when the PUSCH is scheduled by random access response (abbreviated as RAR) or fallback random access response (fallback RAR), $N_{T,1}+N_{T,2}+0.5$ is used to repalce $T_{proc,2}$ in FIG. 3B to represent the processing time between UL grant and PUSCH, where, $N_{T,1}$ corresponds to the PDSCH decoding time for UE processing capability 1 and is a duration of $N_1$ symbols, $N_{T,2}$ corresponds to the PUSCH preparation time for UE processing capability 1 and is a duration of $N_2$ symbols. For reduced capacity equipment, such as Redcap UE, due to its low requirements in latency, the PUSCH preparation time of the Redcap UE can be relaxed, i.e. the PUSCH preparation time $N_2$ can be extended. In this scenario, if a scheduled transmission of the PUSCH is carried out according to the existing protocol, there may be scenarios where PUSCH transmission is carried out while bandwidth is being switched or other services are in progress, making it impossible to transmit PUSCH and resulting in invalid PUSCH transmission.

Based on the above technical problems, an embodiment of the present application provides a data transmission scheme, to ensure the effective transmission of feedback information and/or PUSCH.

Based on the above hardware structure of the terminal device and the communication network system, various embodiments of the present application are proposed.

Figure 4:
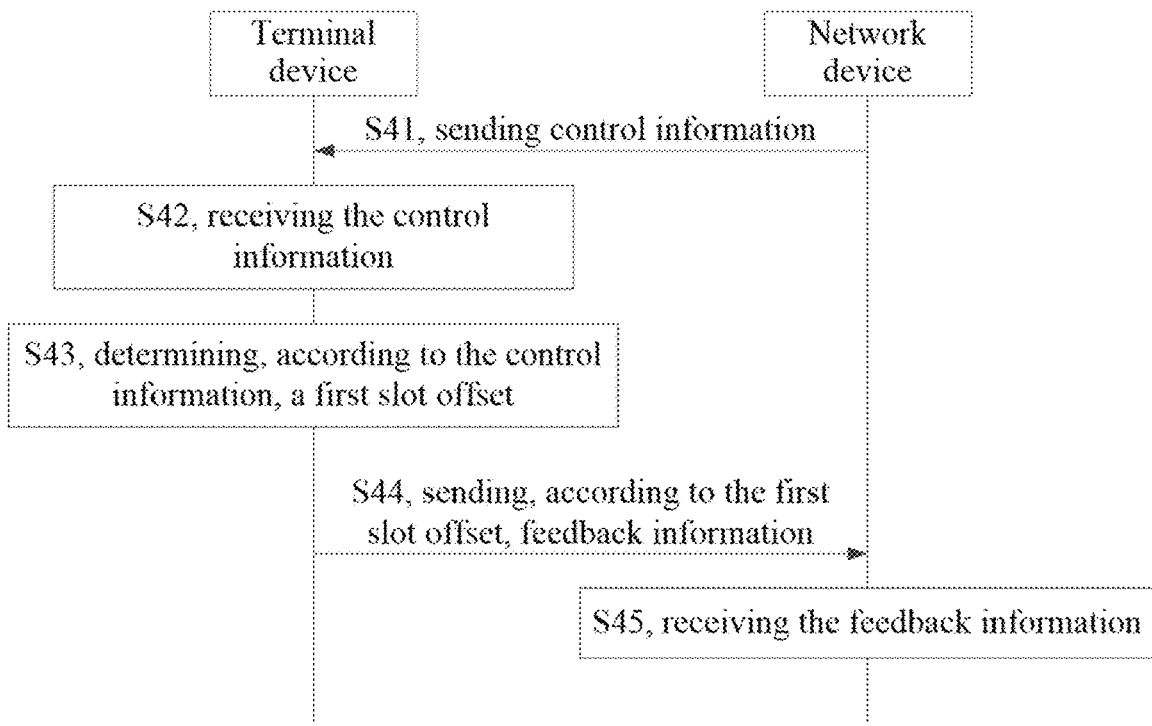
FIG. 4 is a schematic diagram 1 of a signaling interaction of a data transmission method provided in an embodiment of the present application.

FIG. 4 is a schematic diagram 1 of a signaling interaction of a data transmission method provided in an embodiment of the present application. As shown FIG. 4, the method may include:

S41, a network device sends control information.

The network device may be a base station eNB, a gNB core network device, a transmission and reception point (Transmission and Reception Point, TRP), a relay station or an access point, etc. The network device sends the control information to a terminal through a PDCCH.

Optionally, the control information sent by the network device includes at least one of: first downlink control information used for scheduling a downlink transmission, second downlink control information used for scheduling an uplink transmission, radio resource control (abbreviated as RRC) information, or medium access control (abbreviated as MAC) information.

Optionally, RAR or fallback RAR is located in a MAC message and is carried by a PDSCH.

S42, a terminal device receives the control information.

After the network device sends the control information to the terminal device, the terminal device can receive the control information.

Optionally, the first downlink control information used for scheduling a downlink transmission at least includes a PDSCH-to-HARQ_feedback timing indicator field, and/or, a device type indication field.

Optionally, the first downlink control information may be DCI format 1_1 or DCI format 1_0 or other newly added downlink DCI format that is applicable to Redcap.

Optionally, the device type indication field in the first downlink control information is the newly added field "type indication" in the first downlink control information.

S43, the terminal device determines, according to the control information, a first slot offset.

Optionally, the first slot offset is a slot offset between a slot where a PDSCH is located and a slot where a PUCCH that carries feedback information corresponding to the PDSCH is located, and can be used to determine a transmission occasion of a PUCCH carrying ACK/NACK information of the PDSCH.

In the below, the way that the terminal device determines the first slot offset according to the first downlink control information will be explained. It can be understood that, the PDSCH-to-HARQ feedback timing indicator field included in the first downlink control information may be a first PDSCH-to-HARQ_feedback timing indicator field, a second PDSCH-to-HARQ_feedback timing indicator field, a third PDSCH-to-HARQ_feedback timing indicator field, a fourth PDSCH-to-HARQ_feedback timing indicator field, or a fifth PDSCH-to-HARQ feedback timing indicator field. In the below, the way of determining the first slot offset according to the PDSCH-to-HARQ_feedback timing indicator field in the first downlink control information will be explained.

Optionally, the first slot offset is determined according to a sum of a first specific slot offset corresponding to the first PDSCH-to-HARQ_feedback timing indicator field in the first downlink control information and a first pre-stored slot offset. The first pre-stored slot offset is determined by a first slot offset table. The first slot offset table includes at least one first pre-stored slot offset and the first slot offset table is pre-stored in the terminal device. A value of the first specific slot offset corresponding to the first PDSCH-to-HARQ_feedback timing indicator field corresponds to a radio resource control parameter DL-DataToUL-ACK. A definition of the radio resource control parameter DL-DataToUL-ACK is as below:

DL-DataToUL-ACK::=SEQUENCE (SIZE (1 . . . 8)) OF INTEGER (0, 1, . . . , 15).

Optionally, the first slot offset is determined according to a second specific slot offset corresponding to the second PDSCH-to-HARQ_feedback timing indicator field in the first downlink control information. The second PDSCH-to-HARQ_feedback timing indicator field is 3-bit field newly added in the first downlink control information. The second PDSCH-to-HARQ_feedback timing indicator field is marked as the PDSCH-to-HARQ_feedback timing indicator field, and a value of the second specific slot offset corresponding to the second PDSCH-to-HARQ_feedback timing indicator field corresponds to a radio resource control parameter DL-DataToUL-ACK-redcap. A definition of the radio resource control parameter DL-DataToUL-ACK-redcap is as below:

DL-DataToUL-ACK-redcap::=SEQUENCE (SIZE (1 . . . 8)) OF INTEGER (0, 1, . . . , 31).

Optionally, the first slot offset is determined according to a third specific slot offset corresponding to the third PDSCH-to-HARQ_feedback timing indicator field in the first downlink control information. A bit number corresponding to the third PDSCH-to-HARQ_feedback timing indicator field is a positive integer greater than 3. Take that the bit number corresponding to the third PDSCH-to-HARQ_feedback timing indicator field is 4 as an example. In the 4-bit third PDSCH-to-HARQ_feedback timing indicator field, a value range of the third specific slot offset corresponding to bit 0000~bit 0111 is {0, 1, . . . , 15}, i.e. the first slot offset determined by the third specific slot offset can still be used for ACK/NACK scheduling of a legacy UE. A value range of the third specific slot offset corresponding to bit 1000~bit 1111 is {16, . . . , 31}, i.e. the first slot offset determined by the third specific slot offset can meet the ACK/NACK scheduling requirement for relaxed processing in Redcap UE. Determination of the first slot offset according to the third specific slot offset corresponding to the third PDSCH-to-HARQ_feedback timing indicator field whose bit number is a positive integer greater than 3 can not only achieve effective scheduling of legacy UE, but also fully accommodate the scheduling requirements of extended scheduling time required by Redcap UE in relaxed processing. That is to say, determination of the first slot offset using the PDSCH-to-HARQ_feedback timing indicator field of a specific bit number can achieve compatible coexistence of Redcap UE and the legacy UE.

Optionally, the first slot offset is determined according to the device type indication field and/or a fourth specific slot offset corresponding to the fourth PDSCH-to-HARQ_feedback timing indicator field in the first downlink control information. The device type indication field in the first downlink control information is used to distinguish whether the first downlink control information is applied to Redcap UE or legacy UE. For example, if the device type indication field is 1, current first downlink control information is used for Redcap UE, and/or, if the device type indication field is 0, current first downlink control information is used for legacy UE. The bit number occupied by the fourth PDSCH-to-HARQ_feedback timing indicator field is 3. When the device type indication field is different, the fourth specific slot offset corresponding to the fourth PDSCH-to-HARQ_feedback timing indicator field is different. For example, if the device type indication field indicates that current first downlink control information is used for Redcap UE, a value range of the fourth specific slot offset for the fourth PDSCH-to-HARQ_feedback timing indicator field corresponds to a value range in a radio resource control information DL-DataToUL-ACK-redcap. In other words, a value of the fourth specific slot offset for the 3-bit fourth PDSCH-to-HARQ feedback timing indicator field is 8 values among $\{0, 1, \ldots, 31\}$. If the current device type indication field indicates that current first downlink control information is used for legacy UE, a value range of the fourth specific slot offset for the 3-bit fourth PDSCH-to-HARQ_feedback timing indicator field corresponds to a value range in a radio resource control information DL-DataToUL-ACK. In other words, a value of the 3-bit fourth PDSCH-to-HARQ_feedback timing indicator is 8 values among $\{0, 1, \ldots, 15\}$.

Optionally, the first slot offset is determined according to a third slot offset in specific radio resource control information corresponding to the fifth PDSCH-to-HARQ_feedback timing indicator field. If the base station has recognized that the current terminal is Redcap UE, the 3-bit fifth PDSCH-to-HARQ_feedback timing indicator field in the first downlink control information sent to the terminal corresponds to the third slot offset in specific radio resource control information, where the specific radio resource control information is DL-DataToUL-ACK-redcap is defined as follows:

DL-DataToUL-ACK-redcap::=SEQUENCE (SIZE (1 . . . 8)) OF INTEGER (0, 1, . . . , 31).

The third slot offset in the specific radio resource control information is any 8 values within the value range of $\{0, 1, \ldots, 31\}$ given by DL-DataToUL-ACK-redcap. By indication of a specific type of a terminal in the specific radio resource control information, such as Redcap UE, a value of the slot offset corresponding to the 3-bit PDSCH-to-HARQ_feedback timing indicator field is redefined, so that there is no need to increase the bit number of the PDSCH-to-HARQ_feedback timing indicator field in DCI, and effective ACK/NACK time for a scenario of relaxed processing in Redcap UE is determined by redefinition of the DCI field, which facilitates compatibility between legacy UE and Redcap UE.

According to the above description of determining the first slot offset, the first slot offset includes at least one of: a sum of a specific slot offset corresponding to a PDSCH-to-HARQ_feedback timing indicator field and a first pre-stored slot offset, a specific slot offset corresponding to a PDSCH-to-HARQ_feedback timing indicator field, the device type indication field and/or a specific slot offset corresponding to a PDSCH-to-HARQ_feedback timing indicator field, or the third slot offset in specific radio resource control information corresponding to a PDSCH-to-HARQ_feedback timing indicator field. It can be understood that, the PDSCH-to-HARQ_feedback timing indicator field of the at least one item included in the first slot offset may be implemented by any one of the first PDSCH-to-HARQ_feedback timing indicator field, the second PDSCH-to-HARQ_feedback timing indicator field, the third PDSCH-to-HARQ_feedback timing indicator field, the fourth PDSCH-to-HARQ_feedback timing indicator field, the fifth PDSCH-to-HARQ_feedback timing indicator field described above.

S44, the terminal device sends, according to the first slot offset, feedback information.

Optionally, when sending, according to the first slot offset, the feedback information, the terminal device can determine, according to the first slot offset, a first transmission occasion for sending a PUCCH carrying ACK/NACK information, and send, according to the first transmission occasion, the PUCCH carrying the ACK/NACK information. Optionally, the feedback information is carried on the PUCCH.

S45, the network device receives the feedback information.

Optionally, after the terminal device sends the feedback information carried on the PUCCH to the network device, the network device receives the feedback information.

From this, it can be seen that, according to the technical solution provided by the present application, the terminal device can determine the first slot offset based on the received control information sent by the network device, and determine the occasion for sending the feedback information based on the first slot offset, so that the processing of the corresponding PDSCH is completed before sending the ACK/NACK information of the corresponding PDSCH. The first slot offset determined by the above approaches can ensure that the effective transmission of the ACK/NACK corresponding to the PDSCH is completed.

Figure 5:
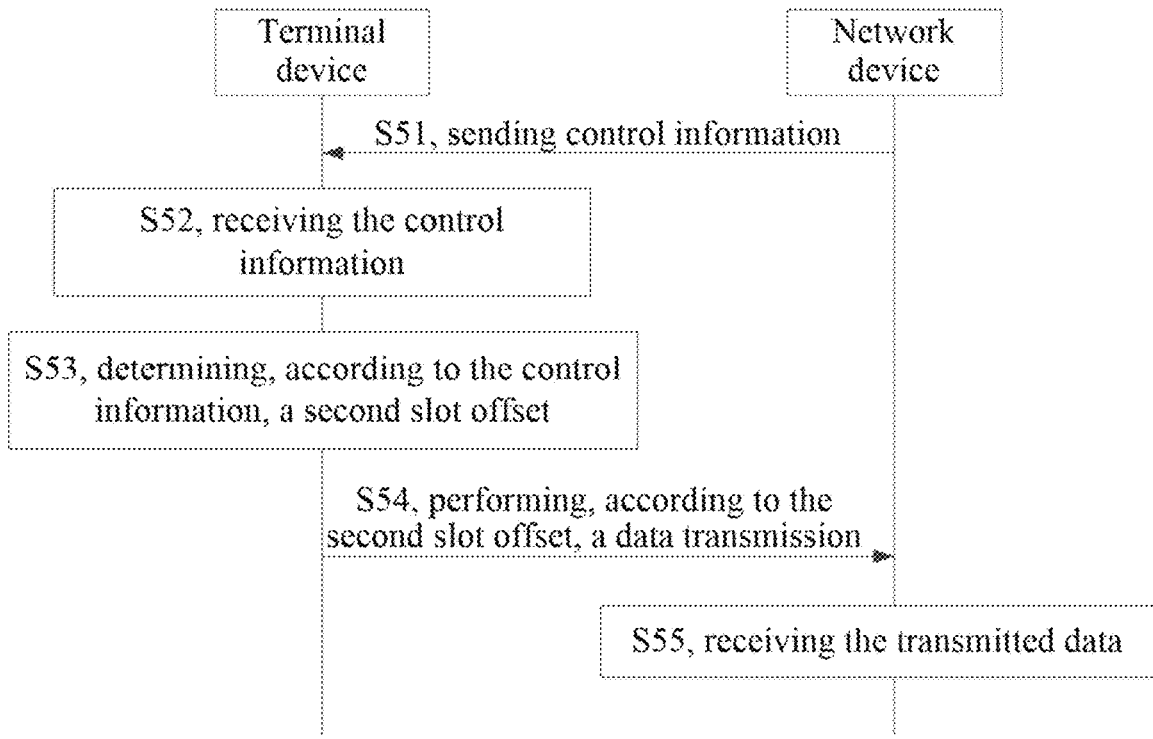
FIG. 5 is a schematic diagram 2 of a signaling interaction of a data transmission method provided in an embodiment of the present application.

FIG. 5 is a schematic diagram 2 of a signaling interaction of a data transmission method provided in an embodiment of the present application. As shown FIG. 5, the method may include:

S51, a network device sends control information.

Optionally, the control information sent by the network device includes at least one of: first downlink control information used for scheduling a downlink transmission, second downlink control information used for scheduling an uplink transmission, radio resource control (abbreviated as RRC) information, or medium access control (abbreviated as MAC) information.

Optionally, RAR or fallback RAR is located in a MAC message and is carried by a PDSCH.

S52, a terminal device receives the control information.

After the network device sends the control information to the terminal device, the terminal device can receive the control information.

Optionally, the second downlink control information used for scheduling an uplink transmission at least includes a time domain resource assignment field.

Optionally, the second downlink control information may be DCI format 0_1 or DCI format 0_0 or other newly added uplink DCI format that is applicable to Redcap. The second downlink control information can be used to determine a second slot offset used for performing a data transmission of a PUSCH.

Optionally, the time domain resource assignment field used for scheduling an uplink transmission may also be in RAR or fallback RAR.

Optionally, the second slot offset used for performing a data transmission of a PUSCH can be determined according to RAR or fallback RAR.

S53, the terminal device determines, according to the control information, a second slot offset.

Optionally, when the PUSCH is scheduled by DCI, the second slot offset is a slot offset between a slot where a PDCCH is located and a slot where a PUSCH scheduled by the PDCCH is located; when the PUSCH is scheduled by RAR/fall back RAR, the second slot offset is a slot offset between a slot where a PDSCH carrying RAR/fallback RAR is located and a slot where a PUSCH scheduled by RAR or fall back RAR is located. In other words, the second slot offset can be used to determine a transmission occasion of the PUSCH scheduled by the PDCCH, RAR or fallback RAR. The terminal device determines the second slot offset according to the second downlink control information and/or RAR or fall back RAR in a MAC message.

In the below, a way that the terminal device determines the second slot offset according to the second downlink control information will be explained. It can be understood that, the time domain resource assignment field in the second downlink control information may be a first time domain resource assignment field, a second time domain resource assignment field, a third time domain resource assignment field, or a fourth time domain resource assignment field. In the below, a way of determining the second slot offset according to the time domain resource assignment field in the second downlink control information will be explained.

Optionally, the second slot offset of data transmission is determined according to a sum of a fifth specific slot offset corresponding to the first time domain resource assignment field in the control information and a second pre-stored slot offset. The second pre-stored slot offset is determined by a second slot offset table. The second slot offset table is pre-stored in the terminal device, and the second slot offset table includes at least one second pre-stored slot offset. A bit number occupied by the first time domain resource assignment field is 4, and the fifth specific slot offset corresponding to the first time domain resource assignment field is determined by table 10, table 11, and table 15.

Optionally, the second slot offset of data transmission is determined according to a six specific slot offset in a specific table corresponding to the second time domain resource assignment field; optionally, the six specific slot offset is related to a third pre-stored slot offset. Optionally, the third pre-stored slot offset is used to determine a value of j related to the second slot offset.

Optionally, the third slot offset table, where the third pre-stored slot offset is located, is shown in table 1.

TABLE 1

| $\mu_{PUSCH}$ | j |
|---|---|
| 0 | 2 |
| 1 | 2 |
| 2 | 4 |
| 3 | 6 |

Optionally, a value of the third pre-stored slot offset j can be obtained according to table 1, then the sixth specific slot offset is determined according to the specific tables (table 10 and table 11) corresponding to a value of the second time domain resource assignment field, finally, the second slot offset of data transmission is determined by the sixth specific slot offset.

Optionally, the second slot offset of data transmission is determined according to a seventh specific slot offset in a specific table corresponding to the third time domain resource assignment field in the second downlink control information. A bit number of the third time domain resource assignment field is a positive integer greater than 4. Taking that the bit number of the third time domain resource assignment field is 5 as an example, the specific table corresponding to the third time domain resource assignment field is table 13 or table 14. The seventh specific slot offset is a specific slot in table 13 or table 14 which is the specific table corresponding to a value of the third time domain resource assignment field.

Optionally, the second slot offset is determined according to a fourth slot offset in specific radio resource control information defined in the second downlink control information corresponding to the fourth time domain resource assignment field.

According to the above description of determining the second slot offset, the second slot offset includes at least one of: a sum of a specific slot offset corresponding to a time domain resource assignment field and the second pre-stored slot offset; a specific slot offset in a specific table corresponding to a time domain resource assignment field, where the specific slot offset is related to the third pre-stored slot offset; a specific slot offset in a specific table corresponding to a time domain resource assignment field; or a fourth slot offset in specific radio resource control information corresponding to a time domain resource assignment field. It can be understood that, the time domain resource assignment field of the at least one item included in the second slot offset may be implemented by any one of the first time domain resource assignment field, the second time domain resource assignment field, the third time domain resource assignment field, or the fourth time domain resource assignment field described above.

S54, the terminal device performs, according to the second slot offset, data transmission.

Optionally, when performing, according to the second slot offset, the data transmission, the terminal device can determine, according to the second slot offset, a second transmission occasion, and perform, according to the second transmission occasion, a PUSCH transmission. Optionally, the data transmission is carried on the PUSCH.

S55, the network device receives the transmitted data.

Optionally, when the terminal device transmits data carried on the PUSCH to the network device, the network device receives the transmitted data.

The technical solution provided by the present application can determine the second slot offset according to the received control information sent by the network device, and perform the data transmission according to the second slot offset. Preparation work of corresponding PUSCH is completed before sending the PUSCH. For example, the bandwidth part has already switched from a downlink bandwidth to an uplink bandwidth. With the second slot offset determined by the above approaches, uplink transmission can be completed within appropriate uplink transmission time and appropriate resource.

The above embodiments provide a brief description of the approaches of the terminal device determining the first slot offset and the second slot offset. The following will provide a detailed description of the approaches for determining the first slot offset and the second slot offset in conjunction with specific examples.

Firstly, a detailed description of determining the first slot offset will be provided in conjunction with a specific embodiment.

Optionally, the first slot offset can be determined according to a sum of a first specific slot offset corresponding to a first PDSCH-to-HARQ_feedback timing indicator field in first downlink control information and a first pre-stored slot offset. The first pre-stored slot offset delta1 is included in a first slot offset table pre-stored in a terminal device. Optionally, the first slot offset table is table 2 or table 3 or table 4. In fact, a value of the first slot offset determined by this approach is K1+delta1. Optionally, K1 is the first specific slot offset corresponding to the 3-bit first PDSCH-to-HARQ_feedback timing indicator field in the first downlink control information. A value of an RRC parameter corresponding to the first PDSCH-to-HARQ_feedback timing indicator field is:

DL-DataToUL-ACK::=SEQUENCE (SIZE (1 . . . 8)) OF INTEGER (0, 1, . . . , 15).

Figure 6:
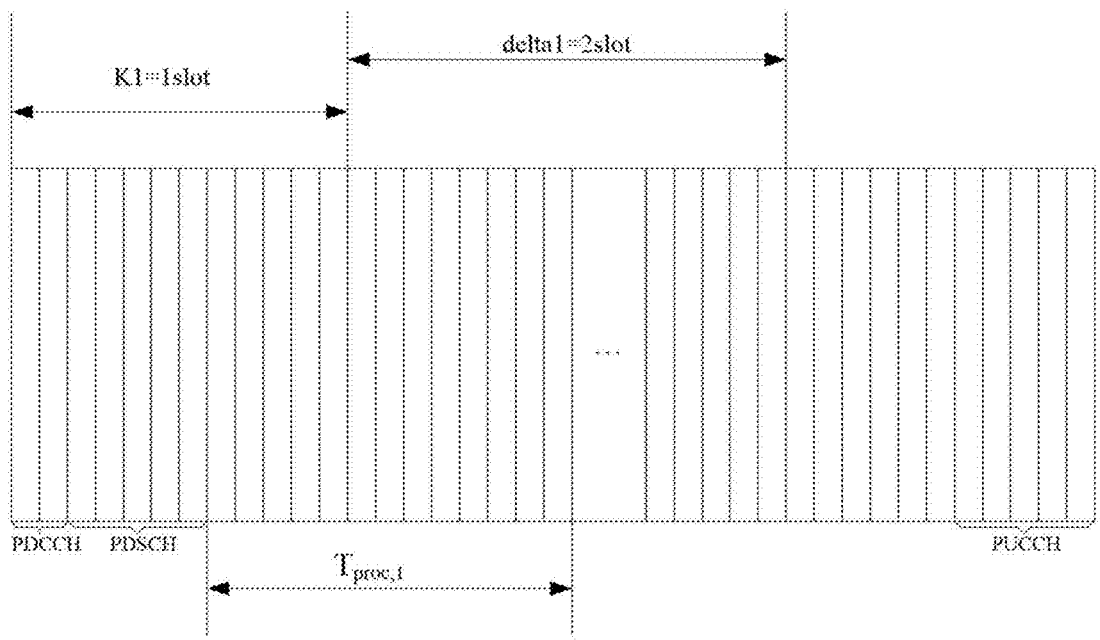
FIG. 6 is a schematic diagram 1 of a slot for a data transmission provided in an embodiment of the present application.

FIG. 6 is a schematic diagram 1 of a slot for a data transmission provided in an embodiment of the present application. Let the subcarrier spacing of PDSCH, PUCCH, and PDCCH corresponding to the data transmission slots shown in FIG. 6 are all 30 KHz. If the PDSCH decoding time $N_1$ value for Redcap UE is expanded to twice as much as a value of $N_1$ in legacy UE, that is, if the $N_1$ value of legacy UE is 10 symbols, then the $N_1$ value of Redcap UE is expanded to 20 symbols. If the values of other variables except $N_1$ in the calculation formula of the UE processing time $T_{proc,1}=(N_1+d_{1,1}+d_2)(2048+144)\cdot K2^{-\mu}\cdot T_c+T_{ext}$ remain unchanged, the PDSCH processing time for Redcap UE is increased by at least 10 symbols compared to legacy UE. It is assumed that the PDSCH processing time for legacy UE is 10 symbols, the PDSCH processing time for Redcap UE is 20 symbols. Let K1 corresponding to the first PDSCH-to-HARQ_feedback timing indicator equals to 1 slot. Since the processing time of legacy UE is 10 symbols in this embodiment, that K1 equals 1 slot can reserve enough time for legacy UE to perform PDSCH processing; however, for Redcap UE, due to its PDSCH processing time changing to 20 symbols, after an offset of 1 slot, Redcap UE may not have completed the PDSCH reception processing work yet, which means that the ACK/NACK is invalid at this occasion. In order to meet the relaxed processing requirement of PUSCH in Recap UE, one first pre-stored slot offset delta1 can be pre-stored in the terminal device, and a first slot offset of Recap UE is determined according to K1+delta1. Optionally, delta1 is acquired from table 2 or table 3 or table 4. In fact, since the subcarrier spacing of PUCCH, PDSCH, and PDCCH are 30 Hz, i.e. μ=1, taking table 2 as an example, it can be obtained that delta1=2, and thereby the first slot offset is determined as K1+delta1=1+2=3 slots. Obviously, a value of 3 slots of the first slot offset is sufficient to meet the relaxed PDSCH processing time requirement of 20 symbols for Redcap UE.

Optionally, the first pre-stored slot offset delta1 can be only related to the subcarrier spacing and is independent of UE capability. Taking that the PDSCH decoding time $N_1$ for Redcap UE is extended to twice as much as the original as an example, the first slot offset table pre-stored in the terminal device is described in table 2 below:

TABLE 2

| μ | delta 1 |
|---|---|
| 0 | 1 |
| 1 | 2 |
| 2 | 4 |
| 3 | 6 |

Optionally, the first pre-stored slot offset delta1 can be related to both UE capability and the subcarrier spacing μ. Taking that the PDSCH decoding time $N_1$ is expanded to twice as much as the original as an example, the first slot offset table pre-stored in Redcap UE is shown in table 3 and table 4. Optionally, table 3 corresponds to UE capability 1, table 4 corresponds to UE capability 2, and μ represents a minimum subcarrier spacing in PDCCH, PDSCH, and PUCCH.

TABLE 3

| μ | delta 1 (Time slot) | |
|---|---|---|
| | dmrs-AdditionalPosition = 'pos0' in DMRS-DownlinkConfig in dmrs-DownlinkForPDSCH-Mapping TypeA and dmrs-DownlinkForPDSCH-MappingTypeB if either higher layer parameter is configured, and in dmrs-DownlinkForPDSCH-MappingTypeA-DCI-1-2 and dmrs-DownlinkForPDSCH-MappingTypeB-DCI-1-2 if either higher layer parameter is configured | dmrs-AdditionalPosition ≠ 'pos0' in DMRS-DownlinkConfig in any of dmrs-DownlinkForPDSCH-Mapping TypeA, dmrs-DownlinkForPDSCH-MappingTypeB, dmrs-DownlinkForPDSCH-Mapping TypeA-DCI-1-2, dmrs-DownlinkForPDSCH-MappingTypeB-DCI-1-2, or if none of the higher layer parameters is configured |
| 0 | 1 | 1 |
| 1 | 1 | 1 |
| 2 | 2 | 2 |
| 3 | 2 | 2 |

TABLE 4

| μ | delta 1 (Time slet) |
|---|---|
| | dmrs-AdditionalPosition ≠ 'pos0' in DMRS-DownlinkConfig in any of dmrs-DownlinkForPDSCH-MappingTypeA, dmrs-DownlinkForPDSCH-MappingTypeB, dmrs-DownlinkForPDSCH-MappingTypeA-DCI-1-2, dmrs-DownlinkForPDSCH-MappingTypeB-DCI-1-2, or if none of the higher layer parameters is configured |
| 0 | 1 |
| 1 | 1 |
| 2 | 1 |

Optionally, values of the first pre-stored slot offset delta1 in above table 2, table 3, and table 4 also need to at least meet the processing time requirements of table 5.

TABLE 5

| μ | delta 1 (Time slot) |
|---|---|
| 0 | $[(T_{proc,1,redcap} - T_{proc,1,normal})/(\kappa \cdot T_c \cdot 14 \cdot (2048 + 144))]$ |
| 1 | $[\{(T_{proc,1,redcap} - T_{proc,1,normal}) \cdot 2\}/(\kappa \cdot T_c \cdot 14 \cdot (2048 + 144))]$ |
| 2 | $[\{(T_{proc,1,redcap} - T_{proc,1,normal}) \cdot 4\}/(\kappa \cdot T_c \cdot 14 \cdot (2048 + 144))]$ |
| 3 | $[\{(T_{proc,1,redcap} - T_{proc,1,normal}) \cdot 8\}/(\kappa \cdot T_c \cdot 14 \cdot (2048 + 144))]$ |

In the formulas in above table 5, $T_{proc,1,redcap}$ represents the PDSCH processing time for Redcap UE, $T_{proc,1,normal}$ represents the PDSCH processing time for legacy UE, where $\kappa=T_s/T_c$, $T_s=1/(\Delta f_{ref} \cdot N_{f,ref})$, $T_c=1/(\Delta f_{max} \cdot N_f)$, $\Delta f_{max}=15\times 10^3$ Hz, $N_{f,ref}=2048$, $N_f=4096$.

Optionally, the first slot offset is determined by a third PDSCH-to-HARQ feedback timing indicator field in first downlink control information. A bit number of the third PDSCH-to-HARQ_feedback timing indicator field is a positive integer greater than 3. Take that the bit number occupied by the third PDSCH-to-HARQ_feedback timing indicator field is 4 as an example. In the 4-bit representation, a value range corresponding to bit 0000~bit 0111 is {0, 1, . . . , 15}, a value range corresponding to bit 1000~bit 1111 is {16, . . . , 31}, i.e. bit 0000~bit 0111 are used to ensure ACK/NACK scheduling of a legacy UE, and bit 1000~bit 1111 are used to ensure the ACK/NACK scheduling when Redcap UE adopts relaxed PDSCH processing. In summary, with the third PDSCH-to-HARQ_feedback timing indicator field, scheduling compatibility between Redcap UE and legacy UE can be achieved, the scheduling time mismatch problem caused by the extension of PDSCH decoding time $N_1$ can be solved, and the effectiveness of the transmitted ACK/NACK messages is ensured.

Figure 7:
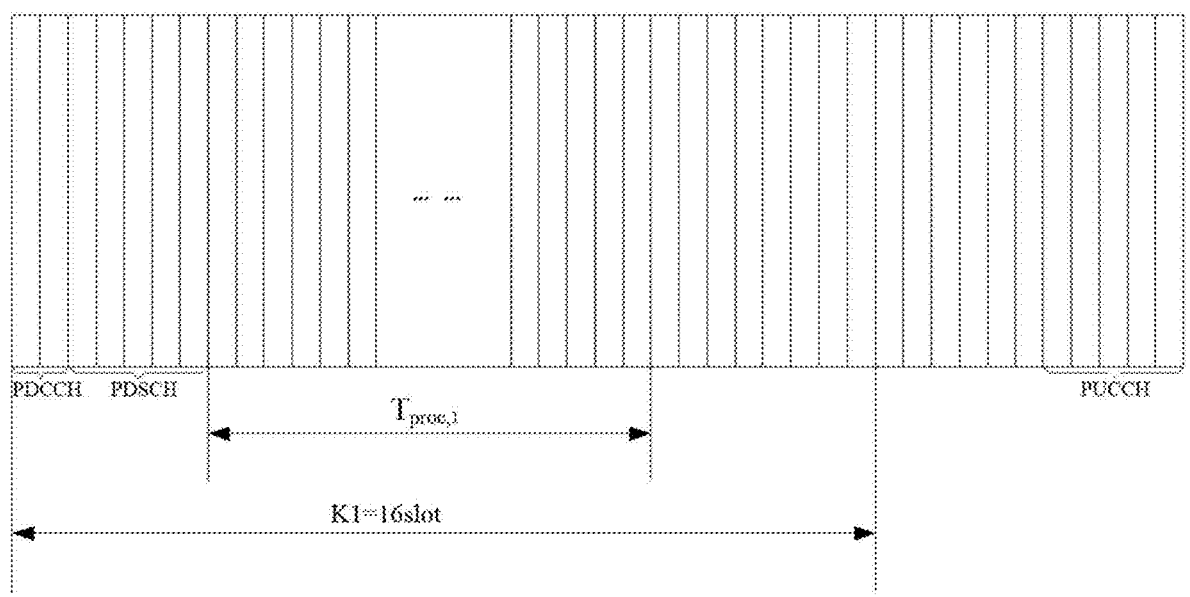
FIG. 7 is a schematic diagram 2 of a slot for a data transmission provided in an embodiment of the present application.

FIG. 7 is a schematic diagram 2 of a slot for a data transmission provided in an embodiment of the present application. Let the subcarrier spacing of PDSCH, PUCCH, and PDCCH corresponding to the data transmission slots shown in FIG. 7 are all 30 KHz. If the PDSCH decoding time $N_1$ value for Redcap UE is expanded to twice as much as a value of $N_1$ in legacy UE, that is, if the $N_1$ value of legacy UE is 10 symbols, then the $N_1$ value of Redcap UE is 20 symbols. If the values of other variables except $N_1$ in the calculation formula of the PDSCH processing time of UE $T_{proc,1}=(N_1+d_{1,1}+d_2)(2048+144)\cdot K2^{-\mu}\cdot T_c+T_{ext}$ remain unchanged, the PDSCH processing time for Redcap UE is increased by at least 10 symbols compared to legacy UE. If it is assumed that the PDSCH processing time for legacy UE is 206 symbols, and the PDSCH processing time for Redcap UE is 216 symbols, and according to possible values of K1 specified by the existing protocol, a maximum value of K1 can be 15 slots. Obviously, for legacy UE, 15 slots are sufficient to meet 206 symbols of the PDSCH processing time. However, for Redcap UE, since its PDSCH processing time is 216 symbols, the duration of 15 slots reserved according to the specification of the existing protocol is insufficient to meet the PDSCH relaxed processing time requirement of 216 symbols, i.e., 15 slots cannot meet the PDSCH processing time requirement of 216 symbols. In fact, if Redcap UE starts to receive PDSCH at slot n, Redcap UE does not complete the PDSCH reception at slot n+15, that is, ACK/NACK information at this slot is invalid. In this embodiment, assuming that a bit number of the third PDSCH-to-HARQ_feedback timing indicator field is 4, and it is agreed that, in the 4 bits, bit 0000~bit 0111 are used to meet the scheduling offset of legacy UE, and a value range of the scheduling offset is {0, 1, . . . , 15}; bit 1000~bit 1111 are used for the scheduling offset for Redcap UE with large processing delay, and a value range of the scheduling offset is {16, 17, . . . , 31}. Then, in order to meet the processing time requirement of 216 symbols of the Redcap UE in this embodiment, the value of the third PDSCH-to-HARQ_feedback timing indicator field corresponds to 16 slots.

Optionally, the first slot offset is determined according to a third slot offset in specific radio resource control information corresponding to the fifth PDSCH-to-HARQ_feedback timing indicator field. Optionally, a definition of the specific radio resource control information DL-DataToUL-ACK-redcap is as below:

DL-DataToUL-ACK-redcap::=SEQUENCE (SIZE (1 . . . 8)) OF INTEGER (0, 1, . . . , 31).

In fact, a value range of DL-DataToUL-ACK-redcap may also be {1, 2, 4, 6, 8, 10, 13, 16}, as long as a maximum value within the value range can meet the longest processing time of Redcap UE.

It is assumed that a value of the 3-bit fifth PDSCH-to-HARQ_feedback timing indicator field is {2, 5, 9, 10, 14, 16, 17, 18}. As the embodiment shown in FIG. 7, if the PDSCH decoding time $N_1$ value for Redcap UE is expanded to twice as much as a value of $N_1$ in legacy UE, and the values of other variables except $N_1$ in the calculation formula of the UE processing time $T_{proc,1}=(N_1+d_{1,1}+d_2)(2048+144)\cdot K2^{-\mu}\cdot T_c+T_{ext}$ remain unchanged, the PDSCH processing time for Redcap UE is increased by at least 10 symbols compared to legacy UE. In fact, if the PDSCH processing time for legacy UE is 206 symbols, the PDSCH processing time for Redcap UE is 216 symbols. In order to meet the PDSCH processing time for 216 symbols, the value of the 3-bit PDSCH-to-HARQ_feedback timing indicator field can be "101", which corresponds to an offset of 16 slots. Since 16 slots includes 16*14-224 symbols, a duration of 224 symbols is greater than the processing time for 216 symbols, the value of the fifth PDSCH-to-HARQ feedback timing indicator field corresponding to a specific RRC parameter DL-DataToUL-ACK-redcap can meet the relaxed processing requirement of the Redcap UE. In fact, if following the existing protocol, since a maximum value of DL-DataToUL-ACK is 15 slots, the value of the PDSCH-to-HARQ_feedback timing indicator field cannot meet the scenario where PDSCH decoding time of Redcap UE is extended.

Optionally, the problem of insufficient slots for data transmission shown in FIG. 7 can also be solved by the approach of newly adding the device type indication field in the first downlink control information. Optionally, a specified terminal type to which the first downlink control information applies can be determined according to the device type indication field, and then a bit value of the fourth PDSCH-to-HARQ_feedback timing indicator field applicable to the scenario of the relaxed processing of Redcap UE is determined, and finally the first slot offset is determined.

If the device type indication field is 1, current first downlink control information is applied to Redcap UE, and/or, if the device type indication field is 0, current first downlink control information is applied to legacy UE. For different types of terminal devices, there are different understandings on the 3-bit fourth PDSCH-to-HARQ_feedback timing indicator field in the first downlink control information. For example, if a current device type indication field indicates the current first downlink control information is applied to Redcap UE, a value range of the 3-bit fourth PDSCH-to-HARQ_feedback timing indicator field in the first downlink control information corresponds to the value range of the newly added RRC parameter DL-DataToUL-ACK-redcap, that is, the value of the 3-bit fourth PDSCH-to-HARQ_feedback timing indicator field is any 8 values among {0, 1, . . . , 31}. If a current device type indication field indicates the current first downlink control information is applied to legacy UE, a value range of the 3-bit fourth PDSCH-to-HARQ feedback timing indicator field in the first downlink control information corresponds to the value range of the RRC parameter DL-DataToUL-ACK, that is, the value of the 3-bit fourth PDSCH-to-HARQ_feedback timing indicator field is any 8 values among {0, 1, . . . , 15}.

Next, a detailed description of determining the second slot offset will be provided in conjunction with a specific embodiment.

Optionally, when PUSCH is scheduled by the second downlink control information, the second slot offset can be determined by a sum of a fifth specific slot offset corresponding to the first time domain resource assignment field in the second downlink control information and a second pre-stored slot offset. The second pre-stored slot offset delta2 is included in a second slot offset table pre-stored in the terminal device.

Optionally, when PUSCH is scheduled by RAR or fallback RAR, the second slot offset can be determined by a sum of a fifth specific slot offset corresponding to the first time domain resource assignment field in RAR or fallback RAR and a second pre-stored slot offset. The second pre-stored slot offset delta2 is included in a second slot offset table pre-stored in the terminal device.

Figure 8:
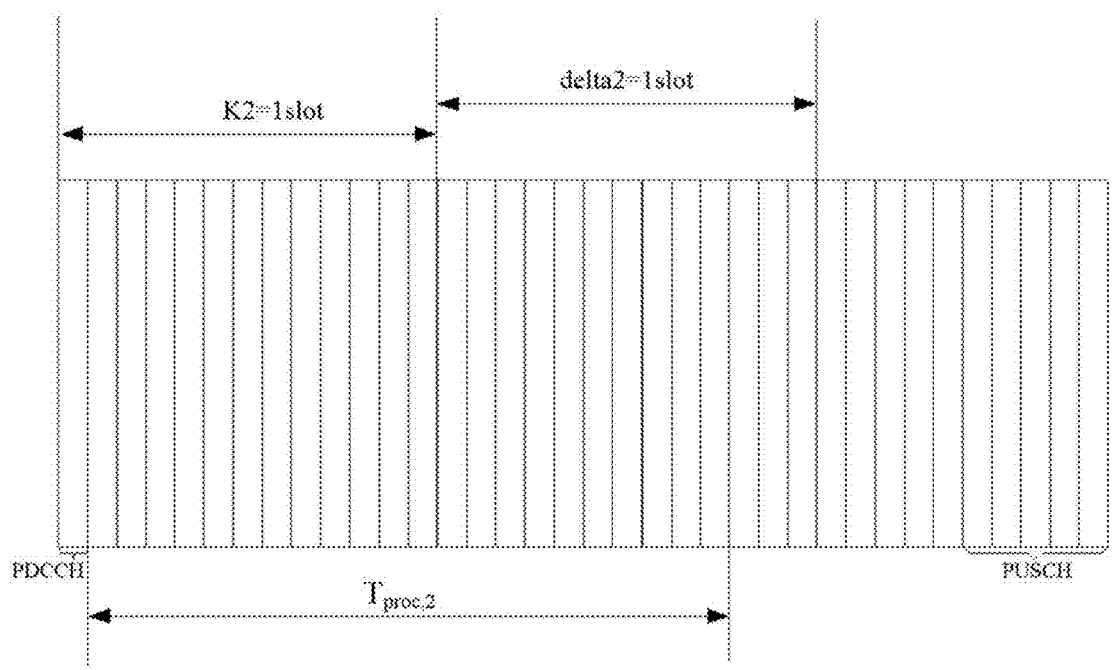
FIG. 8 is a schematic diagram 3 of a slot for a data transmission provided in an embodiment of the present application.

FIG. 8 is a schematic diagram 3 of a slot for a data transmission provided in an embodiment of the present application. Let the subcarrier spacing of PUSCH, PDCCH, and PDSCH corresponding to the data transmission slots shown in FIG. 8 are all 30 KHz. PUSCH uses a normal cyclic prefix, a time domain mapping type of PUSCH is Type B and a starting symbol of PUSCH is S=4, a symbol duration of PUSCH is L=10, that is the first time domain resource assignment field in the second downlink control information is '0101' (the tables applied by the first time domain resource assignment field are table 10 and table 11). If the time domain mapping type of PUSCH remains unchanged and PUSCH preparation time $N_2$ value is expanded to twice as much as an existing value of $N_2$, and if it is assumed that the value of $N_2$ of legacy UE is set to 12 symbols, the PUSCH preparation time of Redcap UE is increased by at least 12 symbols compared to legacy UE without changing the values of other variables except $N_2$ in the calculation formula of the preparation procedure time before PUSCH transmission $T_{proc,2}=\max((N_2+d_{2,1}+d_2)\cdot(2048+144)\cdot K2^{-\mu}\cdot T_c+T_{ext}+T_{switch}, d_{2,2})$. That is, if the PUSCH preparation procedure time of legacy UE is 12 symbols, the PUSCH preparation procedure time of Redcap UE is 24 symbols. According to that the value of the first time domain resource assignment field is '0101', it can be known a transmission interval between DCI and PUSCH is 1 slot. Since 1 slot includes 14 symbols, it can ensure processing time for 12 symbols in legacy UE. However, for Redcap UE, since its PUSCH preparation time is changed from 12 symbols to 24 symbols, Redcap UE may be conducting BWP switching and other services after 1 slot offset, the PUSCH transmitted at this occasion is invalid. In order to meet the relaxed PUSCH processing requirement of the Recap UE, a second pre-stored slot offset delta2 can be pre-stored in the terminal device, that is, for Redcap UE, its second slot offset is K2+delta2. Since the subcarrier spacing of PUSCH is 30 KHz, it can be known $\mu=1$; then according to a newly added offset table 6, it can be known delta1=2. That is, in a scenario of this embodiment, for Redcap UE, an offset of PDCCH relative to PUSCH is K2+delta2=1+1=2 slots. Since 2 slots includes 14*2=28 symbols, it can meet preparation procedure time of 24 symbols for Redcap UE to perform PUSCH transmission, i.e. ensure the effective transmission of PUSCH.

Similarly, if the preparation procedure time before PUSCH transmission is replaced with $N_{T,1}+N_{T,2}+0.5$ msec, and similarly, the value of $N_2$ is increased from 12 symbols to 24 symbols, the value of the first time domain resource assignment field in RAR or fallback RAR is '0101', then K2=1. In this way, only processing time from RAR to PUSCH in legacy UE can be ensured, while processing time from RAR or fallback RAR to PUSCH in Redcap UE cannot be met. Therefore, the processing time from RAR or fallback RAR to PUSCH can be increased by the manner of K2+delta2. Specifically, assuming that a slot where RAR is located is n, then a slot where PUSCH scheduled by RAR or fallback RAR is located is n+K2+delta2+delta, where delta is a value of an offset of PUSCH scheduled by RAR or fallback RAR provided in the existing protocol.

Optionally, the second pre-stored slot offset delta2 of the terminal device is included in a pre-stored second slot offset table. A value of the second pre-stored slot offset can be only related to the subcarrier spacing $\mu$ and is independent of UE capability. Taking that the PUSCH preparation time $N_2$ is extended to twice as much as the original as an example, the second slot offset table pre-stored in the terminal device is described in table 6 below:

TABLE 6

| μ | delta2 |
|---|---|
| 0 | 1 |
| 1 | 1 |
| 2 | 4 |
| 3 | 6 |

Optionally, the second slot offset table includes at least one second pre-stored slot offset delta2, and a value of the second pre-stored slot offset can be related to both UE capability and the subcarrier spacing $\mu$. The value of delta2 is shown in table 7 and table 8. Optionally, table 7 is applicable to UE capability 1, and table 8 is applicable to UE capability 2.

TABLE 7

| μ | delta2 |
|---|---|
| 0 | 1 |
| 1 | 2 |
| 2 | 2 |
| 3 | 3 |

TABLE 8

| μ | delta2 |
|---|---|
| 0 | 1 |
| 1 | 1 |
| 2 | 1 |

Optionally, delta2 in above tables also needs to at least meet the processing time requirements of table 9 below.

TABLE 9

| μ | delta2 (Time slot) |
|---|---|
| 0 | $[(T_{proc,2,redcap} - T_{proc,2,normal})/(\kappa \cdot T_c \cdot 14 \cdot (2048 + 144))]$ |
| 1 | $[\{(T_{proc,2,redcap} - T_{proc,2,normal}) \cdot 2\}/(\kappa \cdot T_c \cdot 14 \cdot (2048 + 144))]$ |
| 2 | $[\{(T_{proc,2,redcap} - T_{proc,2,normal}) \cdot 4\}/(\kappa \cdot T_c \cdot 14 \cdot (2048 + 144))]$ |
| 3 | $[\{(T_{proc,2,redcap} - T_{proc,2,normal}) \cdot 8\}/(\kappa \cdot T_c \cdot 14 \cdot (2048 + 144))]$ |

In the formulas in above table 9, $T_{proc,2,redcap}$ represents the PUSCH preparation procedure time of the Redcap UE, $T_{proc,2,normal}$ represents the PUSCH preparation procedure time of the legacy UE, where, $\kappa=T_s/T_c$, $T_s=1/(\Delta f_{ref}\cdot N_{f,ref})$, $T_c=1/(\Delta f_{max}\cdot N_f)$, $\Delta f_{max}=15\times 10^3$ Hz, $N_{f,ref}=2048$, $N_f=4096$.

Optionally, the second slot offset can be determined by the six specific slot offset in the specific table corresponding to the second time domain resource assignment field, where, the six specific slot offset is related to the third pre-stored slot offset. The third pre-stored slot offset is pre-stored in the third slot offset table.

TABLE 10

| Row index | PUSCH mapping type | K2 | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 11

| Row index | PUSCH mapping type | K2 | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

Optionally, a value of j in the third slot offset table is related to the subcarrier spacing, that is, if the subcarrier spacing is different, the value of the third pre-stored slot offset j is different. By pre-storing the third slot offset table in the terminal device, the requirements of Redcap UE for relaxed PUSCH processing can be met without changing the number of bits and values of existing DCI. The third slot offset table is shown in table 12 below:

TABLE 12

| μ | j |
|---|---|
| 0 | 2 |
| 1 | 2 |
| 2 | 4 |

For example, the subcarrier spacing of PUSCH and PDCCH are 15 KHz, PUSCH uses a normal cyclic prefix, a time domain mapping type of PUSCH is Type B and a starting symbol of PUSCH is S=4, and a symbol duration of PUSCH is L=10, that is, the second time domain resource assignment field in the second downlink control information is '0101'. If the time domain mapping type of PUSCH remains unchanged and a value of PUSCH preparation time $N_2$ is expanded to twice as much as an existing value of $N_2$, and if it is assumed that the value of Tproc,2 of legacy UE is set to 12 symbols, the PUSCH preparation time of Redcap UE is increased by at least 12 symbols compared to legacy UE without changing the values of other variables except $N_2$ in the calculation formula of the preparation procedure time before PUSCH transmission $T_{proc,2}=\max((N_2+d_{2,1}+d_2)(2048+144)\cdot K2^{-\mu}\cdot T_c+T_{ext}+T_{switch}, d_{2,2})$. That is, if the PUSCH preparation procedure time of legacy UE is 12 symbols, the PUSCH preparation procedure time of Redcap UE is 24 symbols. According to that the value of the second time domain resource assignment field is '0101' and table 10, table 15 and the subcarrier spacing of PUSCH, it can be known that a slot offset from DCI to PUSCH is j=1 slot. For legacy UE, one slot offset is sufficient for PUSCH to complete relevant services processing of PUSCH with processing time of 12 symbols, i.e. for legacy UE, this scheduling time assignment is reasonable. However, for Redcap UE, since its PUSCH processing time is 24 symbols, Redcap UE may be conducting bandwidth switching and other services after one slot offset, the conduction of transmission of PUSCH at this occasion is invalid. In order to solve the problem of invalid PUSCH transmission, the present application newly defines table 12. For Redcap UE, according to a value of j in table 12 and bit '0101' of the second time domain resource assignment field, it can be known, the second slot offset is adjusted to j=2 slots. Since 2 slots includes 2*14=28 symbols, the PUSCH preparation time requirement of 24 symbols can be met by the newly defined scheduling table, and thereby the effective transmission of PUSCH can be ensured. The approach of determining the second slot offset by using the third pre-stored slot offset can achieve effective PUSCH scheduling in the scenario of relaxed processing in Redcap UE without performing any modification on existing DCI and scheduling table, and ensure effective compatibility between Redcap UE and legacy UE.

Similarly, if the preparation procedure time before PUSCH transmission is replaced with $N_{T,1}+N_{T,2}+0.5$ msec, and similarly, the $N_2$ value is increased from 12 symbols to 24 symbols, the value of the second time domain resource assignment field in RAR or fallback RAR is '0101', then K2=1. In this way, only processing time from RAR to PUSCH in legacy UE can be ensured, while processing time from RAR or fallback RAR to PUSCH in Redcap UE cannot be met. Therefore, the processing time from RAR or fallback RAR to PUSCH can be increased by the manner that a value of the second time domain resource assignment field is newly defined, for example, newly adding table 12. Specifically, assuming that a slot where RAR is located is n, then a slot where PUSCH scheduled by RAR or fallback RAR is located is n+K2+delta, where delta is a value of an offset of PUSCH scheduled by RAR or fallback RAR provided in the existing protocol, a value of K2 is expanded according to the relaxed processing capability of Redcap UE, such as a value of j corresponding to K2 defined in table 12.

Figure 9:
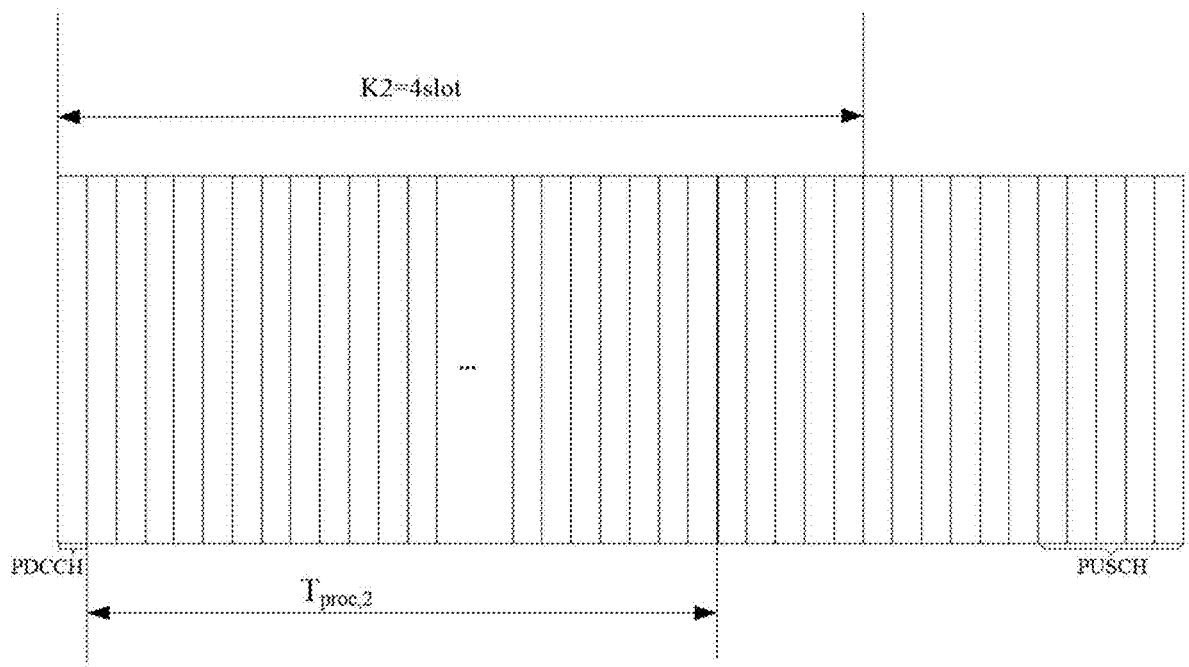
FIG. 9 is a schematic diagram 4 of a slot for a data transmission provided in an embodiment of the present application.

FIG. 9 is a schematic diagram 4 of a slot for a data transmission provided in an embodiment of the present application. Let the subcarrier spacing of PUSCH, PDCCH corresponding to the data transmission slots shown in FIG. 9 are all 30 KHz, PUSCH uses a normal cyclic prefix, a time domain mapping type of PUSCH is Type B and a starting symbol of PUSCH is S=4, a symbol duration of PUSCH is L=10, that is, a bit of the third time domain resource assignment field in the second downlink control information is '0101'. If the time domain mapping type of PUSCH remains unchanged and PUSCH preparation time $N_2$ value is expanded to twice as much as an existing value of $N_2$, and if it is assumed that the $N_2$ value of legacy UE is set to 12 symbols, the PUSCH preparation procedure time of Redcap UE is increased by at least 12 symbols compared to legacy UE without changing the values of other variables except $N_2$ in the calculation formula of the preparation procedure time before PUSCH transmission) $T_{proc,2}=\max((N_2+d_{2,1}+d_2)$ $(2048+144) \cdot K2^{-\mu} \cdot T_c + T_{ext} + T_{switch}, d_{2,2})$. In fact, if the PUSCH preparation procedure time of legacy UE is 12 symbols, the PUSCH preparation procedure time of Redcap UE is 24 symbols. At the same time, according to a bit value '0101' of the third time domain resource assignment field and table 10, table 12, it can be known the first slot offset is 1 slot. For legacy UE, 1 slot can meet its preparation time of 12 symbols of legacy UE; however, for Redcap UE, since its PUSCH processing time is 24 symbols, Redcap UE may be conducting bandwidth part switching and other services after 1 slot offset, that is, for Redcap UE, 1 slot offset is insufficient at this occasion. Therefore, for Redcap UE, this embodiment sets the bits occupied by the third time domain resource assignment field as 5 bits, and newly adds default scheduling table 13 and scheduling table 14. That is, for Redcap UE, under the situation that the time domain mapping of PUSCH remain unchanged, a bit value of the time domain resource assignment field is '10011', at this occasion, the first slot offset is K2=j+3=4 slots. Obviously, 4 slots offset can meet the processing time requirement of 24 symbols of Redcap UE. Therefore, the requirement of relaxed processing of Redcap UE can be met by expanding the third time domain resource assignment field and newly adding the corresponding scheduling tables.

Similarly, if the preparation procedure time before PUSCH transmission is replaced with $N_{T,1}+N_{T,2}+0.5$ msec, and similarly, the $N_2$ value is increased from 12 symbols to 24 symbols, the value of the third time domain resource assignment field in RAR or fallback RAR is '0101', then K2=1. In this way, only processing time from RAR to PUSCH in legacy UE can be ensured, while processing time from RAR or fallback RAR to PUSCH in Redcap UE cannot be met. Therefore, the processing time from RAR or fallback RAR to PUSCH can be increased by expanding a bit number occupied by the third time domain resource assignment field and a corresponding table, for example, newly adding table 13 or table 14. Specifically, assuming that a slot where RAR is located is n, then a slot where PUSCH scheduled by RAR or fallback RAR is located is n+K2+delta, where delta is an offset value of PUSCH scheduled by RAR or fallback RAR provided in the existing protocol, a value of K2 can be configured with appropriate bit values based on the relaxed processing capability of Redcap UE.

When the bit number corresponding to the third time domain resource assignment field in the second downlink control information, RAR or fallback RAR is 5 bits, for a normal CP, a default scheduling table of PUSCH is shown in table 13 in the below; for an expanded CP, the default scheduling table is shown in table 14 in the below.

TABLE 13

| Row index | PUSCH mapping type | K2 | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |

TABLE 13-continued

| Row index | PUSCH mapping type | K2 | S | L |
|---|---|---|---|---|
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |
| 17 | Type A | j + 3 | 0 | 12 |
| 18 | Type B | j + 3 | 2 | 10 |
| 19 | Type B | j + 3 | 4 | 10 |
| 20 | Type B | j + 3 | 4 | 8 |
| 21 | Type B | j + 3 | 4 | 6 |
| 22 | Type A | j + 4 | 0 | 14 |
| 23 | Type A | j + 4 | 0 | 12 |
| 24 | Type A | j + 4 | 0 | 10 |
| 25 | Type A | j + 5 | 0 | 14 |
| 26 | Type A | j + 5 | 0 | 12 |
| 27 | Type A | j + 5 | 0 | 10 |
| 28 | Type B | j + 3 | 8 | 6 |
| 29 | Type A | j + 6 | 0 | 14 |
| 30 | Type A | j + 6 | 0 | 10 |

TABLE 14

| Row index | PUSCH mapping type | K2 | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |
| 17 | Type A | j + 3 | 0 | 12 |
| 18 | Type B | j + 3 | 2 | 10 |
| 19 | Type B | j + 3 | 4 | 4 |
| 20 | Type B | j + 3 | 4 | 8 |
| 21 | Type B | j + 3 | 4 | 6 |
| 22 | Type A | j + 4 | 0 | 8 |
| 23 | Type A | j + 4 | 0 | 12 |
| 24 | Type A | j + 4 | 0 | 10 |
| 25 | Type A | j + 5 | 0 | 6 |
| 26 | Type A | j + 5 | 0 | 12 |
| 27 | Type A | j + 5 | 0 | 10 |
| 28 | Type B | j + 3 | 8 | 4 |
| 29 | Type A | j + 6 | 0 | 8 |
| 30 | Type A | j + 6 | 0 | 10 |

In above table 13 and table 14, S represents a starting symbol position, L represents a symbol length occupied by PUSCH.

The value of j in table 13 and table 14 can be referred to table 15, and the values of j are related to the subcarrier spacing u.

TABLE 15

| μ | j |
|---|---|
| 0 | 1 |
| 1 | 1 |

TABLE 15-continued

| μ | j |
|---|---|
| 2 | 2 |
| 3 | 3 |

Optionally, the first 16 rows in the above table 13 and table 14 are still applicable to legacy UE, and the newly added 14 rows can meet the relaxed processing of the PUSCH preparation time of Redcap UE.

Figure 10:
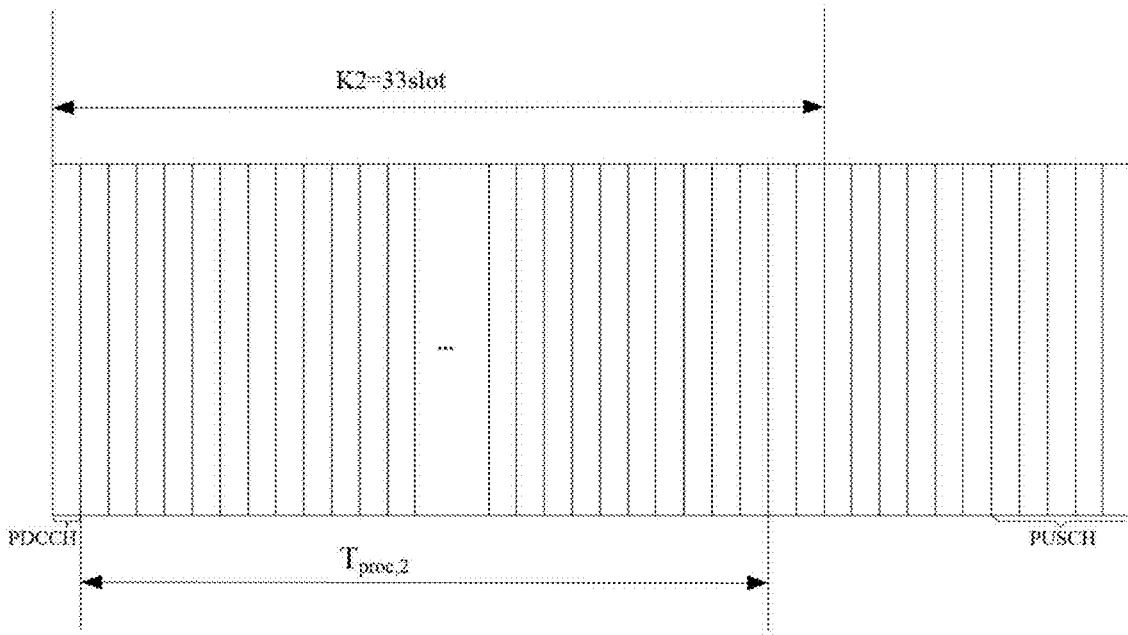
FIG. 10 is a schematic diagram 5 of a slot for a data transmission provided in an embodiment of the present application.

Optionally, the second slot offset can be determined by a slot offset in specific radio resource control information corresponding to the fourth time domain resource assignment field in the second downlink control information. For example, as shown in FIG. 10, FIG. 10 is a schematic diagram 5 of a slot for a data transmission provided in an embodiment of the present application. Assuming that the PUSCH preparation time is 458 symbols, if using a RRC parameter corresponding to a current time domain resource assignment field, it can be known that, a maximum slot offset is 32, i.e. the maximum is 32*14=448 symbols, which cannot met the PUSCH preparation time requirement of Redcap UE of 458 symbols. The slot offset in the specific radio resource control information newly defined in the present application can have a value of 33 slots that is equal to 32*14=462 symbols, which can meet the PUSCH processing time requirement of 458 symbols. The specific RRC parameter newly defined may be represented as:

```
PUSCH-TimeDomainResourceAllocation-Redcap ::= SEQUENCE {
        k2                         INTEGER(0..32..64)
OPTIONAL,  -- Need S
        mappingType                ENUMERATED {typeA, typeB},
        startSymbolAndLength       INTEGER (0..127)
}
```

Optionally, when PUSCH is scheduled by DCI, the second slot offset corresponds to K2 in the specific RRC parameter. In this embodiment, the second slot offset K2 determined by the fourth slot offset is equal to 33 slots.

Optionally, when PUSCH is scheduled by RAR or fallback RAR, the second slot offset corresponds to K2 in the RRC parameter plus delta, where delta is the value of an offset of PUSCH scheduled by RAR or fallback RAR provided in the existing protocol.

It can be understood that for determining the first slot offset and the second slot offset, they can be determined by any of the above manners optionally, or by a combination of the above manners optionally, which will not be limited by the embodiments of the present application.

Figure 11:
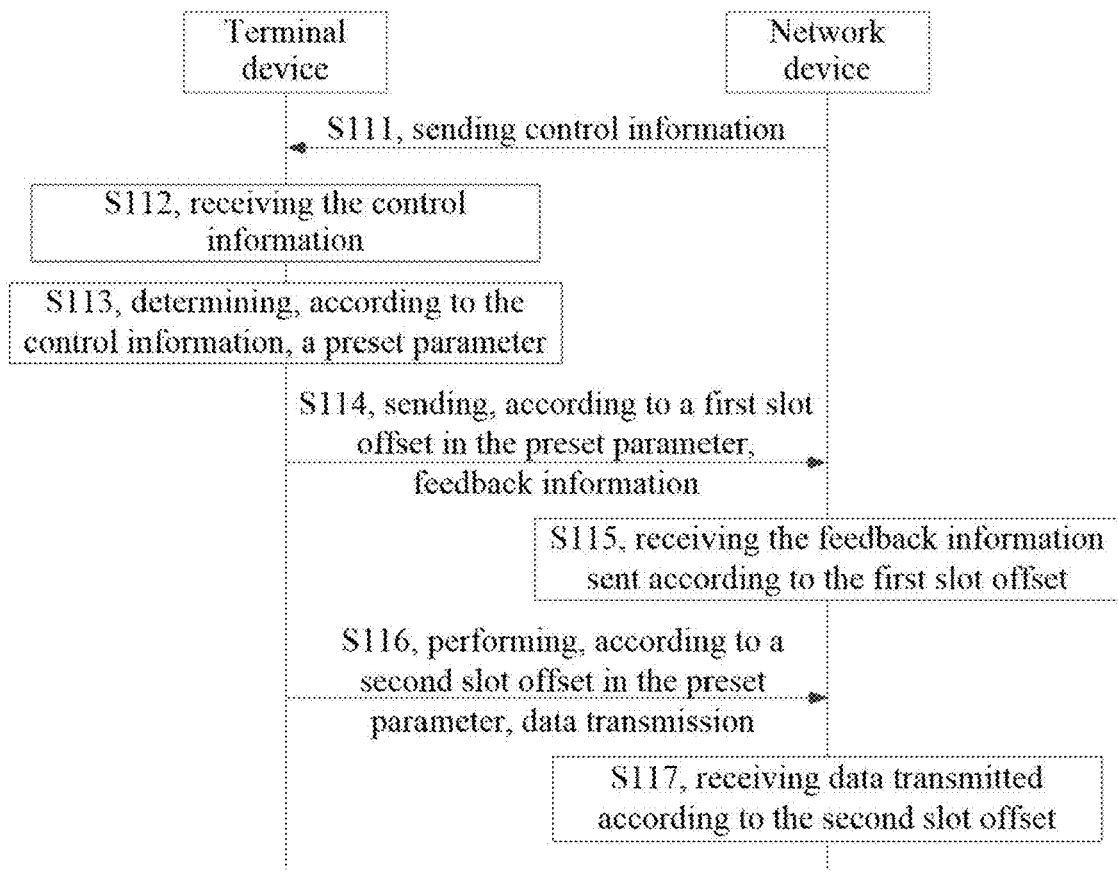
FIG. 11 is a schematic diagram 3 of a signaling interaction of a data transmission method provided in an embodiment of the present application.

FIG. 11 is a schematic diagram 3 of a signaling interaction of a data transmission method provided in an embodiment of the present application. As shown in FIG. 11, the method may include:

S111, a network device sends control information, where the control information is used to determine a preset parameter.

Optionally, the control information sent by the network device includes at least one of: first downlink control information used for scheduling a downlink transmission, second downlink control information used for scheduling an uplink transmission, or radio resource control information.

Optionally, the preset parameter includes a first slot offset and/or a second slot offset. The first slot offset is a slot offset between a slot where a PDSCH is located and a slot where a PUCCH that carries ACK/NACK information corresponding to the PDSCH is located. The second slot offset is a slot offset between a slot where a PDCCH is located and a slot where a PUSCH scheduled by the PDCCH is located.

S112, a terminal device receives the control information.

After the network device sends the control information to the terminal device, the terminal device receives the control information, so as to schedule an uplink transmission according to at least one item of information included in the control information.

S113, the terminal device determines, according to the control information, the preset parameter.

The terminal device can determine the preset parameter according to the control information, i.e. determine the first slot offset and/or the second slot offset according to the control information. Optionally, the preset parameter includes at least one of: a PDSCH-to-HARQ feedback timing indicator field, a device type indication field, a time domain resource assignment field. The device type indication field is used to specify a terminal type to which first downlink control information applies. The PDSCH-to-HARQ_feedback timing indicator field is a PDSCH-to-HARQ_feedback timing indicator field in the first downlink control information. The time domain resource assignment field is a time domain resource assignment field in the second downlink control information.

Optionally, the first slot offset determined by the terminal device may be at least one of:

a sum of a specific slot offset corresponding to a PDSCH-to-HARQ_feedback timing indicator field and a first pre-stored slot offset, a specific slot offset corresponding to a PDSCH-to-HARQ_feedback timing indicator field, the device type indication field and/or a specific slot offset corresponding to a PDSCH-to-HARQ_feedback timing indicator field in the first downlink control information, a third slot offset in specific radio resource control information corresponding to a PDSCH-to-HARQ_feedback timing indicator field.

Optionally, the first pre-stored slot offset may be a slot offset in a first slot offset table pre-stored in the terminal device, and the first slot offset table includes at least one first pre-stored slot offset. The first pre-stored slot offset is only related to a subcarrier spacing, or, the first pre-stored slot offset is related to both the subcarrier spacing and UE capability.

Optionally, any bit corresponding to the PDSCH-to-HARQ_feedback timing indicator field meets: a value of the bit is different if the device type indication field is different, and/or the value of the bit is different if a corresponding field in the specific radio resource control information corresponding to the PDSCH-to-HARQ_feedback timing indicator field is different.

Optionally, a bit number corresponding to the PDSCH-to-HARQ_feedback timing indicator field may be a positive integer greater than or equal to 3.

The second slot offset determined by the terminal device may include at least one of: a sum of a fifth specific slot offset corresponding to a time domain resource assignment field and a second pre-stored slot offset; a sixth specific slot offset in a specific table corresponding to a time domain resource assignment field, where the sixth specific slot offset in the specific table is related to a third pre-stored slot offset; a seventh specific slot offset in a specific table corresponding to a time domain resource assignment field; a fourth slot offset in specific radio resource control information corresponding to a time domain resource assignment field.

Optionally, the second pre-stored slot offset may be a slot offset in a second slot offset table pre-stored in the terminal device, and the second slot offset table includes at least one second pre-stored slot offset. The second pre-stored slot offset is only related to a subcarrier spacing, or, the second pre-stored slot offset is related to both the subcarrier spacing and UE capability.

Optionally, the sixth specific slot offset in the specific table corresponding to the time domain resource assignment field is related to a third pre-stored slot offset. The third pre-stored slot offset is a slot offset in a third slot offset table pre-stored in the terminal device, and the third slot offset table includes at least one third pre-stored slot offset. The third pre-stored slot offset is related to a subcarrier spacing.

For the fourth slot offset in specific radio resource control information corresponding to the time domain resource assignment field included in the second slot offset, reference can be made to the description of the above embodiments, which will not be repeated here by this embodiment.

S114, the terminal device sends, according to the first slot offset in the preset parameter, feedback information.

The feedback information sent by the terminal device is carried on the PUCCH, and is ACK information or NACK information which is fed back according to an actual situation.

Optionally, the terminal device determines, according to the first slot offset, a first transmission occasion for sending a PUCCH carrying ACK/NACK information, and sends, according to the first transmission occasion, the PUCCH carrying the ACK/NACK information. For example, the terminal device receives the PDSCH at slot n, then sends the information carrying ACK/NACK at slot n+K1. Optionally, K1 is the first slot offset.

S115, the network device receives the feedback information sent according to the first slot offset.

S116, the terminal device performs data transmission according to the second slot offset in the preset parameter.

Data transmitted by the terminal device is carried on the PUSCH.

Optionally, the terminal device determines, according to the second slot offset, a second transmission occasion, and performs, according to the second transmission occasion, the PUSCH transmission. For example, the terminal device receives the second downlink control information at slot n, then performs the data transmission at slot n+K2, where K2 is the second slot offset.

S117, the network device receives data transmitted according to the second slot offset.

In the technical solution provided by the present application, the first slot offset and the second slot offset determined by the terminal device can ensure effective PDSCH decoding time of relaxed processing and effective PUSCH preparation time of relaxed processing, that is, effective transmission of ACK/NACK information related to PDSCH and effective transmission of PUSCH data can be ensured by the first slot offset and the second slot offset.

Figure 12:
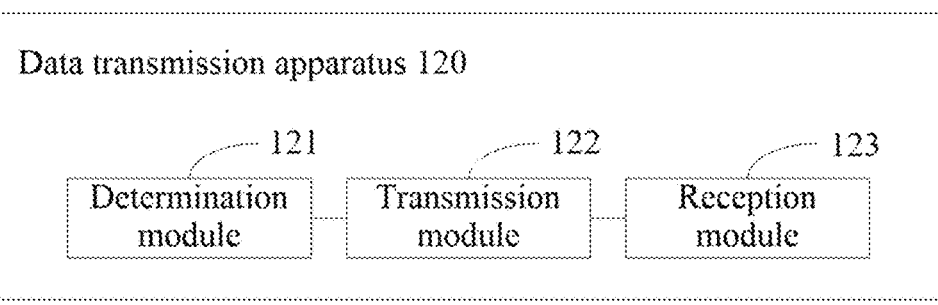
FIG. 12 is a schematic structural diagram 1 of a data transmission apparatus provided in an embodiment of the present application.

FIG. 12 is a schematic structural diagram 1 of a data transmission apparatus provided in an embodiment of the present application. As shown in FIG. 12, the data transmission apparatus 120 includes:

a determination module 121, configured to determine, according to control information, a first slot offset and a second slot offset;

a transmission module 122, configured to: send, according to the first slot offset, feedback information, and perform, according to the second slot offset, a data transmission.

Optionally, in a possible implementation, including at least one of the following:
the control information includes at least one of the following: first downlink control information used for scheduling a downlink transmission, second downlink control information used for scheduling an uplink transmission, or radio resource control information;
the first slot offset is a slot offset between a slot where a PDSCH is located and a slot where a PUCCH that carries feedback information corresponding to the PDSCH is located;
the second slot offset is a slot offset between a slot where a PDCCH is located and a slot where a PUSCH scheduled by the PDCCH is located;
the feedback information is carried on the PUCCH;
the data transmission is carried on the PUSCH.

Optionally, in a possible implementation, including at least one of the following:
the first downlink control information includes a PDSCH-to-HARQ_feedback timing indicator field, and/or, a device type indication field;
the second downlink control information includes a time domain resource assignment field.

Optionally, in a possible implementation, including at least one of the following:
a bit number corresponding to the PDSCH-to-HARQ_feedback timing indicator field is a positive integer greater than or equal to 3;
a bit number corresponding to the time domain resource assignment field is a positive integer greater than or equal to 4;
the device type indication field is used to specify a terminal type to which the first downlink control information applies;
any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, the apparatus further includes a reception module 123, and the reception module is configured to receive the control information.

Optionally, in a possible implementation, the apparatus is configured to perform at least one of the following:
pre-storing a first slot offset table, where the first slot offset table includes at least one first pre-stored slot offset;
pre-storing a second slot offset table, where the second slot offset table includes at least one second pre-stored slot offset;
pre-storing a third slot offset table, where the third slot offset table includes at least one third pre-stored slot offset.

Optionally, in a possible implementation, including at least one of the following:
the first slot offset includes at least one of the following:
a sum of a specific slot offset corresponding to a PDSCH-to-HARQ_feedback timing indicator field and the first pre-stored slot offset;
a specific slot offset corresponding to a PDSCH-to-HARQ_feedback timing indicator field;
the device type indication field and/or a specific slot offset corresponding to a PDSCH-to-HARQ_feedback timing indicator field in the first downlink control information;

a third slot offset in specific radio resource control information corresponding to a PDSCH-to-HARQ_feedback timing indicator field.

the second slot offset includes at least one of the following:
a sum of a fifth specific slot offset corresponding to a time domain resource assignment field and the second pre-stored slot offset;
a sixth specific slot offset in a specific table corresponding to a time domain resource assignment field, where the sixth specific slot offset in the specific table is related to the third pre-stored slot offset;
a seventh specific slot offset in a specific table corresponding to a time domain resource assignment field;
a fourth slot offset in specific radio resource control information corresponding to a time domain resource assignment field.

Optionally, the transmission module 122 is specifically configured to:
determine, according to the first slot offset, a first transmission occasion for sending a PUCCH carrying ACK/NACK information; and send, according to the first transmission occasion, the PUCCH carrying the ACK/NACK information.

Optionally, the transmission module 122 is specifically configured to:
determine, according to the second slot offset, a second transmission occasion; and perform, according to the second transmission occasion, the PUSCH transmission.

The data transmission apparatus provided by the embodiment of the present application can execute the technical solution shown in the above method embodiments, and its implementation principle and beneficial effects are similar, which will not be repeated here.

Figure 13:
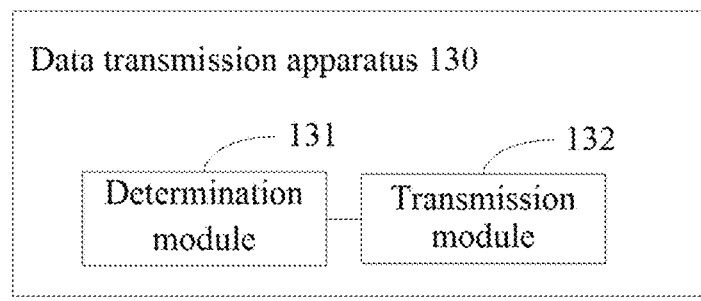
FIG. 13 is a schematic structural diagram 2 of a data transmission apparatus provided in an embodiment of the present application.

FIG. 13 is a schematic structural diagram 2 of a data transmission apparatus provided in an embodiment of the present application. As shown in FIG. 13, the data transmission apparatus 130 includes:
a determination module 131, configured to determine a preset parameter;
a transmission module 132, configured to: according to the preset parameter, send feedback information and perform a data transmission.

Optionally, the preset parameter includes at least one of the following:
a PDSCH-to-HARQ_feedback timing indicator field;
a device type indication field;
a time domain resource assignment field.

Optionally, a determination manner of the preset parameter includes:
determining, according to control information, the preset parameter.

Optionally, the control information includes at least one of the following:
first downlink control information used for scheduling a downlink transmission;
second downlink control information used for scheduling an uplink transmission;
radio resource control information.

Optionally, in a possible implementation, including at least one of the following:
the feedback information is carried on the PUCCH;
the data transmission is carried on the PUSCH.

Optionally, the determination module 131 is specifically configured to:
determine, according to the preset parameter, a first slot offset and a second slot offset; send, according to the first slot offset, feedback information, and perform, according to the second slot offset, a data transmission.

Optionally, in a possible implementation, including at least one of the following:
the first slot offset is a slot offset between a slot where a PDSCH is located and a slot where a PUCCH that carries feedback information corresponding to the PDSCH is located;
the second slot offset is a slot offset between a slot where a PDCCH is located and a slot where a PUSCH scheduled by the PDCCH is located.

Regarding the sending, according to the first slot offset, feedback information, the transmission module 132 is specifically configured to: determine, according to the first slot offset, a first transmission occasion for sending a PUCCH carrying ACK/NACK information; and send, according to the first transmission occasion, the PUCCH carrying the ACK/NACK information.

Regarding the performing, according to the second slot offset, a data transmission, the determination module 131 is specifically configured to: determine, according to the second slot offset, a second transmission occasion; and perform, according to the second transmission occasion, the PUSCH transmission.

Optionally, in a possible implementation, including at least one of the following:
a bit number corresponding to the PDSCH-to-HARQ_feedback timing indicator field is a positive integer greater than or equal to 3;
a bit number corresponding to the time domain resource assignment field is a positive integer greater than or equal to 4;
the device type indication field is used to specify a terminal type to which the first downlink control information applies;
any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, in a possible implementation, the apparatus is configured to perform at least one of the following:
pre-storing a first slot offset table, where the first slot offset table includes at least one first pre-stored slot offset;
pre-storing a second slot offset table, where the second slot offset table includes at least one second pre-stored slot offset;
pre-storing a third slot offset table, where the third slot offset table includes at least one third pre-stored slot offset.

Optionally, in a possible implementation, including at least one of the following:
the first slot offset includes at least one of the following:
a sum of a specific slot offset corresponding to a PDSCH-to-HARQ_feedback timing indicator field and the first pre-stored slot offset;
a specific slot offset corresponding to a PDSCH-to-HARQ_feedback timing indicator field;
the device type indication field and/or a specific slot offset corresponding to a PDSCH-to-HARQ_feedback timing indicator field in the first downlink control information;

a third slot offset in specific radio resource control information corresponding to a PDSCH-to-HARQ_feedback timing indicator field.

the second slot offset includes at least one of the following:

a sum of a fifth specific slot offset corresponding to a time domain resource assignment field and the second pre-stored slot offset;

a sixth specific slot offset in a specific table corresponding to a time domain resource assignment field, where the sixth specific slot offset in the specific table is related to the third pre-stored slot offset;

a seventh specific slot offset in a specific table corresponding to a time domain resource assignment field;

a fourth slot offset in specific radio resource control information corresponding to a time domain resource assignment field.

The data transmission apparatus provided by the embodiment of the present application can execute the technical solution shown in the above method embodiments, and its implementation principle and beneficial effects are similar, which will not be repeated here.

Figure 14:
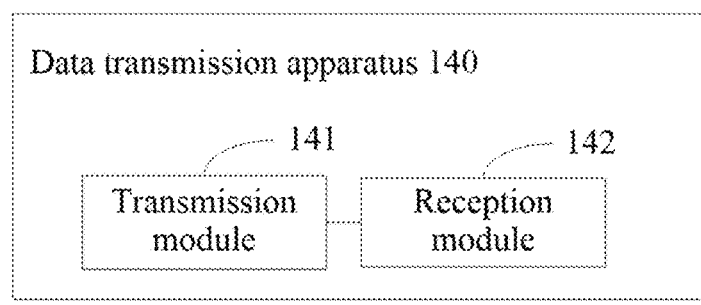
FIG. 14 is a schematic structural diagram 3 of a data transmission apparatus provided in an embodiment of the present application.

FIG. 14 is a schematic structural diagram 3 of a data transmission apparatus provided in an embodiment of the present application. As shown in FIG. 14, the data transmission apparatus 140 includes:

a transmission module 141, configured to send control information used for determining a preset parameter;

a reception module 142, configured to receive data transmitted according to the preset parameter.

Optionally, in a possible implementation, including at least one of the following:

the preset parameter includes a first slot offset and/or a second slot offset;

the control information includes at least one of the following: first downlink control information used for scheduling a downlink transmission, second downlink control information used for scheduling an uplink transmission, or radio resource control information.

Optionally, the transmission module 142 is specifically configured to execute at least one of the following:

receiving the feedback information sent according to the first slot offset;

receiving data transmitted according to the second slot offset.

Optionally, in a possible implementation, including at least one of the following:

the first slot offset is a slot offset between a slot where a PDSCH is located and a slot where a PUCCH that carries feedback information corresponding to the PDSCH is located;

the second slot offset is a slot offset between a slot where a PDCCH is located and a slot where a PUSCH scheduled by the PDCCH is located;

the feedback information is carried on the PUCCH;

data transmitted according to the second slot offset is carried on the PUSCH.

Optionally, in a possible implementation, including at least one of the following:

the first downlink control information includes a PDSCH-to-HARQ_feedback timing indicator field, and/or, a device type indication field;

the second downlink control information includes a time domain resource assignment field.

Optionally, in a possible implementation, including at least one of the following:

a bit number corresponding to the PDSCH-to-HARQ_feedback timing indicator field is a positive integer greater than or equal to 3;

a bit number corresponding to the time domain resource assignment field is a positive integer greater than or equal to 4;

the device type indication field is used to specify a terminal type to which the first downlink control information applies;

any bit corresponding to the PDSCH-to-HARQ_feedback timing indicator field meets: a value of the bit is different if the device type indication field is different, and/or the value of the bit is different if a corresponding field in specific radio resource control information corresponding to the PDSCH-to-HARQ_feedback timing indicator field is different.

Optionally, in a possible implementation, including at least one of the following:

the first slot offset includes at least one of the following: a sum of a specific slot offset corresponding to a PDSCH-to-HARQ_feedback timing indicator field and the first pre-stored slot offset; a specific slot offset corresponding to a PDSCH-to-HARQ_feedback timing indicator field; the device type indication field and/or a specific slot offset corresponding to a PDSCH-to-HARQ_feedback timing indicator field in the first downlink control information; a third slot offset in specific radio resource control information corresponding to a PDSCH-to-HARQ_feedback timing indicator field;

the second slot offset includes at least one of the following: a sum of a fifth specific slot offset corresponding to a time domain resource assignment field and the second pre-stored slot offset; a sixth specific slot offset in a specific table corresponding to a time domain resource assignment field, where the sixth specific slot offset in the specific table is related to the third pre-stored slot offset; a seventh specific slot offset in a specific table corresponding to a time domain resource assignment field; a fourth slot offset in specific radio resource control information corresponding to a time domain resource assignment field.

The data transmission apparatus provided by the embodiment of the present application can execute the technical solution shown in the above method embodiments, and its implementation principle and beneficial effects are similar, which will not be repeated here.

Figure 15:
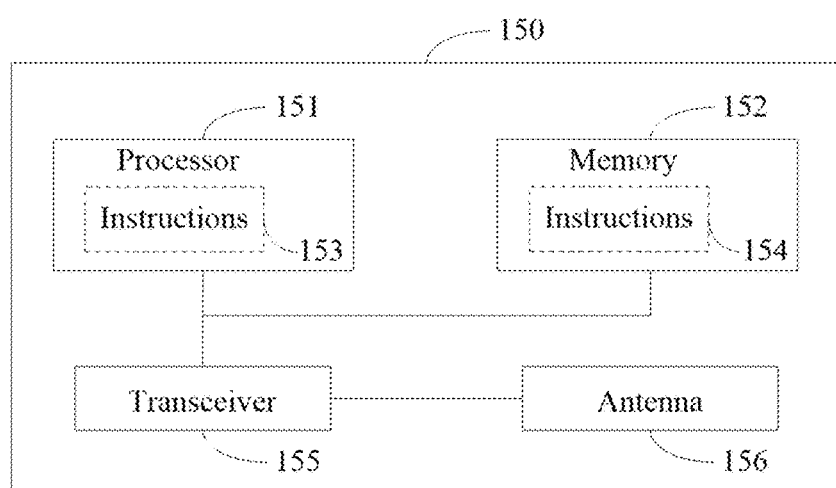
FIG. 15 is a schematic structural diagram of a communication device provided in an embodiment of the present application.

FIG. 15 is a schematic structural diagram of a communication device provided in an embodiment of the present application. As shown in FIG. 15, the communication device 150 described in this embodiment may be a terminal device (or a component that can be used for the terminal device) or a network device (or a component that can be used for the network device) mentioned in the aforementioned method embodiments. The communication device 150 can be used to implement the methods described in the above method embodiments corresponding to terminal devices or network devices, for details, reference can be made to the explanation in the above method embodiments.

The communication device 150 may include one or more processors 151, which can also be referred to as processing units and can achieve certain control or processing functions. The processor 151 can be a general-purpose processor, a dedicated processor, or the like. For example, it can be a baseband processor or a central processing unit. The baseband processor can be used to process communication protocols and communication data, while the central processing unit can be used to control communication devices, execute software programs, and process data of software programs.

Optionally, processor 151 may also store instructions 153 or data (such as intermediate data). Optionally, instructions 153 can be run by processor 151 to cause the communication device 150 to execute the method corresponding to the terminal device or the network device described in the above method embodiments.

Optionally, the communication device 150 may include a circuit that can achieve the functions of sending, receiving, or communicating in the aforementioned method embodiments.

Optionally, the communication device 150 may include one or more memories 152 on which instructions 154 can be stored, the instructions can be run on processor 151 to cause the communication device 150 to execute the methods described in the above method embodiments.

Optionally, data can also be stored in memory 152. The processor 151 and memory 152 can be set separately or integrated together.

Optionally, the communication device 150 may also include a transceiver 155 and/or an antenna 156. The processor 151 may be referred to as a processing unit, which controls the communication device 150 (terminal device, core network device, or wireless access network device). The transceiver 155 may be referred to as a transceiver unit, transponder, transceiver circuit, or transceiver, etc., used to implement the function of reception and transmission of the communication device 150.

Optionally, if the communication device 150 is used to implement operations corresponding to the terminal device in the above respective embodiments, for example, the transceiver 155 may receive configuration information and receive paging early indication at the monitoring occasion indicated by the configuration information. For example, at least one paging early indication parameter can be obtained by transceiver 155, and the processor 151 determines the monitoring occasion of the paging early indication according to the paging early indication parameter. The transceiver 155 receives the paging early indication according to the monitoring occasion.

Optionally, the specific implementation process of processor 151 and transceiver 155 can be seen in the relevant descriptions of the above respective embodiments, which will not be repeated here.

Optionally, if the communication device 150 is used to implement operations corresponding to the network device in the above respective embodiment, for example, the transceiver 155 can send configuration information and send a paging early indication at the monitoring occasion of the paging early indication indicated by the configuration information, the paging early indication is used to indicate whether there is a paging message in at least one paging occasion.

Optionally, the specific implementation process of processor 151 and transceiver 155 can be seen in the relevant descriptions of the above respective embodiments, which will not be repeated here.

Processor 151 and transceiver 155 described in the present application may be implemented on an IC (Integrated Circuit), an analog integrated circuit, a RFIC (Radio Frequency Integrated Circuit), a mixed signal integrated circuit, an ASIC (Application Specific Integrated Circuit), a PCB (Printed Circuit Board), an electronic device, etc. Processor 151 and transceiver 155 can also be manufactured using various integrated circuit process technologies, such as CMOS (Complementary Metal Oxide Semiconductor), NMOS (N Metal-Oxide-Semiconductor), PMOS (Positive channel Metal Oxide Semiconductor), BJT (Bipolar Junction Transistor), bipolar CMOS (BiCMOS), silicon germanium (SiGe), gallium arsenide (GaAs), etc.

In the present application, the communication device may be a terminal device or a network device (such as a base station), which needs to be specifically determined based on the context. In addition, the terminal device may be implemented in various forms. For example, the terminal device described in the present application may include a mobile terminal such as a mobile phone, a tablet, a laptop, a handheld computer, a personal digital assistant (PDA), a portable media player (PMP), a navigation apparatus, a wearable device, a smart wristband, a pedometer, and a fixed terminals such as a digital TV and a desktop computer.

Although in the description of the above embodiments, the communication device is described using a terminal device or a network device as examples, the scope of the communication devices described in the present application is not limited to the aforementioned terminal devices or network devices, and the structure of the communication devices may not be limited by FIG. 15. The communication device may be an independent device or may be a part of larger device.

An embodiment of the present application also provides a terminal device, the terminal device includes a memory and a processor; where, a computer program is stored on the memory, and the steps of the processing method in any of the above embodiments are implemented when the computer program is executed by the processor.

An embodiment of the present application also provides a network device, the network device includes a memory and a processor; where, a computer program is stored on the memory, and the steps of the processing method in any of the above embodiments are implemented when the computer program is executed by the processor.

An embodiment of the present application also provides a computer readable storage medium, where, a computer program is stored on the storage medium, and the steps of the processing method in any of the above embodiments are implemented when the computer program is executed by a processor.

In the embodiments of terminal devices, network devices, and computer readable storage medium provided in the embodiments of the present application, all technical features of any of the aforementioned processing method embodiments can be included. The expanded and explained content of the specification is basically the same as respective embodiment of the aforementioned method, which will not be further repeated here.

An embodiment of the present application also provides a computer program product, the computer program product includes computer program codes, when the computer program codes are running on a computer, the computer is caused to execute the methods in above various possible embodiments.

An embodiment of the present application also provides a chip, including a memory and a processor, where the memory is used to store a computer program, and the processor is used to call and run the computer program from the memory, so that the device installed with the chip can execute the methods in above various possible embodiments.

The serial numbers of the above embodiments in the present application are only for description and do not represent the advantages or disadvantages of the embodiments.

The steps in the method of the embodiments of the present application can be sequentially adjusted, merged, and deleted according to actual needs.

The units in the device of the embodiments of the present application can be merged, divided, and deleted according to actual needs.

In the present application, for the same or similar terminology concepts, technical solutions, and/or application scenario descriptions, they are generally only described in detail at the first occurrence. When they are repeated later, they are generally not repeated in detail for conciseness. When understanding the technical solution and other contents of the present application, for the same or similar terminology concepts, technical solutions, and/or application scenario descriptions that are not described in detail later, reference can be made to its previous relevant detailed description.

In the present application, the descriptions of respective embodiments have their own emphasis respectively. For parts that are not detailed or recorded in a certain embodiment, please refer to the relevant descriptions of other embodiments.

Various technical features of the technical solution of the present application can be combined arbitrarily. In order to make the description concise, all possible combinations of various technical features in the above embodiments have not been described. However, as long as there are no contradictions in the combinations of these technical features, all possible combinations should be considered within the scope of the present application.

Through the description of the above implementations, those skilled in the art can clearly understand that the above implementation methods can be implemented through software and necessary universal hardware platforms, and of course, can also be implemented through hardware. However, in many cases, the former is the better implementation. Based on this understanding, the technical solution of the present application essentially or the part of the technical solution that contributes to the prior art, can be reflected in the form of a software product, where the software product is stored in a storage medium (such as ROM/RAM, magnetic disc, optical disc) as mentioned above, including several instructions to enable a terminal device (which may be a mobile phone, a computer, a server, a controlled terminal, or a network device, etc.) to execute the method of each embodiment of the present application.

In the above embodiments, it can be fully or partially implemented through software, hardware, firmware, or any combination thereof. When implemented using software, it can be fully or partially implemented in the form of computer program product. The computer program products include one or more computer instructions. When the computer program instructions are loaded and executed on a computer, all or part of the processes or functions according to the embodiments of the present application are generated. The computer may be a general-purpose computer, a specialized computer, a computer network, or other programmable apparatus. The computer instructions may be stored in a computer readable storage medium, or transmitted from one computer readable storage medium to another computer readable storage medium. For example, the computer instructions may be transmitted from one website site, computer, server, or data center to another website site, computer, server or data center for transmission in a wired way (such as coaxial cable, fiber optic, digital user line) or a wireless way (such as infrared, wireless, microwave, etc.). The computer readable storage medium may be any available medium that a computer can access, or a data storage device such as a server or data center integrated by including one or more available media. The available media can be magnetic media (such as floppy disks, storage disks, magnetic tapes), optical media (such as DVDs), or semiconductor media (such as solid state storage disks (SSDs)).

The above are only exemplary embodiments of the present application and are not intended to limit the patent scope of the present application. Any equivalent structure or equivalent process transformation made by using the description and drawings of the present application, or directly or indirectly applied in other related technical fields, are equally included in the scope of patent protection of the present application.

The invention claimed is:

1. A data transmission method, wherein the data transmission method comprises following steps:
S2, determining, according to control information, a first slot offset and a second slot offset, wherein the first slot offset comprises at least one of following:
a sum of a first specific slot offset corresponding to a physical downlink shared channel to hybrid automatic repeat request feedback timing indicator field and a first pre-stored slot offset, wherein the first pre-stored slot offset is determined according to a duration required by relaxed physical downlink shared channel processing time under a subcarrier spacing, and the first pre-stored slot offset corresponding to a different subcarrier spacing is not exactly the same; or
a device type indication field and a fourth specific slot offset corresponding to the physical downlink shared channel to hybrid automatic repeat request feedback timing indicator field in first downlink control information, wherein the device type indication field is used to specify a terminal type to which the first downlink control information applies;
and/or,
wherein the second slot offset comprises at least one of following:
a sum of a fifth specific slot offset corresponding to a time domain resource assignment field and a second pre-stored slot offset, wherein the second pre-stored slot offset is determined according to a duration required by relaxed physical uplink shared channel transmission preparation time under the subcarrier spacing, and the second pre-stored slot offset corresponding to a different subcarrier spacing is not exactly the same; or
a seventh slot offset in a specific table corresponding to the time domain resource assignment field, wherein a number of rows of the specific table is N, and each row of the specific table corresponds to a slot offset, a slot offset corresponding to a Mth row of the specific table is greater than a slot offset corresponding to any row of first 16 rows of the specific table; both N and M are integers greater than 16, and N is greater than or equal to M; and
S3, sending, according to the first slot offset, feedback information, and performing, according to the second slot offset, a data transmission.

2. The data transmission method according to claim 1, wherein the first slot offset further comprises at least one of following:

a second specific slot offset corresponding to the physical downlink shared channel to hybrid automatic repeat request feedback timing indicator field; or a third slot offset in specific radio resource control information corresponding to the physical downlink shared channel to hybrid automatic repeat request feedback timing indicator field;

the second slot offset further comprises at least one of following:

a fourth slot offset in specific radio resource control information corresponding to the time domain resource assignment field; or a sixth specific slot offset in a specific table corresponding to the time domain resource assignment field, wherein the sixth specific slot offset is related to a third pre-stored slot offset, the third pre-stored slot offset is related to the subcarrier spacing.

3. The data transmission method according to claim 1, comprising at least one of following:

the control information comprises at least one of following: the first downlink control information used for scheduling a downlink transmission, second downlink control information used for scheduling an uplink transmission, or radio resource control information;

the first slot offset is a slot offset between a slot where a physical downlink shared channel is located and a slot where a physical uplink control channel that carries feedback information corresponding to the physical downlink shared channel is located;

the second slot offset is a slot offset between a slot where a physical downlink control channel is located and a slot where a physical uplink shared channel scheduled by the physical downlink control channel is located;

the feedback information is carried on the physical uplink control channel; or the data transmission is carried on the physical uplink shared channel.

4. The data transmission method according to claim 3, comprising at least one of following:

the first downlink control information comprises the physical downlink shared channel to hybrid automatic repeat request feedback timing indicator field, and/or the device type indication field; or the second downlink control information comprises the time domain resource assignment field.

5. The data transmission method according to claim 4, comprising at least one of following:

a bit number corresponding to the physical downlink shared channel to hybrid automatic repeat request feedback timing indicator field is a positive integer greater than or equal to 3;

a bit number corresponding to the time domain resource assignment field is a positive integer greater than or equal to 4;

any bit corresponding to the physical downlink shared channel to hybrid automatic repeat request feedback timing indicator field meets: a value of the bit is different if the device type indication field is different, and/or the value of the bit is different if a corresponding field in specific radio resource control information corresponding to the physical downlink shared channel to hybrid automatic repeat request feedback timing indicator field is different.

6. The data transmission method according to claim 1, before step S2, further comprising step:

S1, receiving the control information.

7. The data transmission method according to claim 1, wherein the data transmission method further comprises at least one of following:

pre-storing a first slot offset table, wherein the first slot offset table comprises at least one first pre-stored slot offset;

pre-storing a second slot offset table, wherein the second slot offset table comprises at least one second pre-stored slot offset; or pre-storing a third slot offset table, wherein the third slot offset table comprises at least one third pre-stored slot offset.

8. The method according to claim 1, wherein the sending, according to the first slot offset, the feedback information comprises:

determining, according to the first slot offset, a first transmission occasion for sending a physical uplink control channel carrying ACK/NACK information; and sending, according to the first transmission occasion, the physical uplink control channel carrying the ACK/NACK information.

9. The method according to claim 1, wherein the performing, according to the second slot offset, the data transmission comprises:

determining, according to the second slot offset, a second transmission occasion for performing a data transmission of a physical uplink shared channel; and performing, according to the second transmission occasion, the data transmission of the physical uplink shared channel.

10. A communication device, comprising: a memory and a processor;

wherein the memory is configured to store program instructions;

the processor is configured to call the program instructions to execute the data transmission method according to claim 1.

11. A non-transitory computer readable storage medium, wherein a computer program is stored on the storage medium, when the computer program is executed, the data transmission method according to claim 1.

12. A data transmission method, wherein the data transmission method comprises following steps:

S11, sending control information used for determining a preset parameter, wherein the preset parameter comprises a first slot offset and/or a second slot offset;

wherein the first slot offset comprises at least one of following:

a sum of a first specific slot offset corresponding to a physical downlink shared channel to hybrid automatic repeat request feedback timing indicator field and a first pre-stored slot offset, wherein the first pre-stored slot offset is determined according to a duration required by relaxed physical downlink shared channel processing time under a subcarrier spacing, and the first pre-stored slot offset corresponding to a different subcarrier spacing is not exactly the same; or a device type indication field and a fourth specific slot offset corresponding to the physical downlink shared channel to hybrid automatic repeat request feedback timing indicator field in first downlink control information, wherein the device type indication field is used to specify a terminal type to which the first downlink control information applies;

and/or, wherein the second slot offset comprises at least one of following:

a sum of a fifth specific slot offset corresponding to a time domain resource assignment field and a second pre-stored slot offset, wherein the second pre-stored slot offset is determined according to a duration required by relaxed physical uplink shared channel transmission preparation time under the subcarrier spacing, and the second pre-stored slot offset corresponding to a different subcarrier spacing is not exactly the same;

or a seventh slot offset in a specific table corresponding to the time domain resource assignment field, wherein a number of rows of the specific table is N, and each row of the specific table corresponds to a slot offset, a slot offset corresponding to a Mth row of the specific table is greater than a slot offset corresponding to any row of first 16 rows of the specific table; both N and M are integers greater than 16, and N is greater than or equal to M; and S12, receiving data transmitted according to the preset parameter.

13. The data transmission method according to claim 12, wherein the first slot offset further comprises at least one of following:

a second specific slot offset corresponding to the physical downlink shared channel to hybrid automatic repeat request feedback timing indicator field; or a third slot offset in specific radio resource control information corresponding to the physical downlink shared channel to hybrid automatic repeat request feedback timing indicator field;

the second slot offset further comprises at least one of following:

a fourth slot offset in specific radio resource control information corresponding to the time domain resource assignment field; or a sixth specific slot offset in a specific table corresponding to the time domain resource assignment field, wherein the sixth specific slot offset is related to a third pre-stored slot offset, the third pre-stored slot offset is related to the subcarrier spacing.

14. The data transmission method according to claim 12, wherein, the control information comprises at least one of following: the first downlink control information used for scheduling a downlink transmission, second downlink control information used for scheduling an uplink transmission, or radio resource control information.

15. The data transmission method according to claim 14, wherein step S12 comprises at least one of following:

receiving feedback information sent according to the first slot offset; or receiving the data transmitted according to the second slot offset.

16. The data transmission method according to claim 15, comprising at least one of following:

the feedback information is carried on a physical uplink control channel; or the data transmitted according to the second slot offset is carried on a physical uplink shared channel.

17. The data transmission method according to claim 14, comprising at least one of following:

the first downlink control information comprises the physical downlink shared channel to hybrid automatic repeat request feedback timing indicator field, and/or, the device type indication field; or the second downlink control information comprises the time domain resource assignment field.

18. The data transmission method according to claim 17, comprising at least one of following:

a bit number corresponding to the physical downlink shared channel to hybrid automatic repeat request feedback timing indicator field is a positive integer greater than or equal to 3;

a bit number corresponding to the time domain resource assignment field is a positive integer greater than or equal to 4; or any bit corresponding to the physical downlink shared channel to hybrid automatic repeat request feedback timing indicator field meets: a value of the bit is different if the device type indication field is different, and/or the value of the bit is different if a corresponding field in specific radio resource control information corresponding to the physical downlink shared channel to hybrid automatic repeat request feedback timing indicator field is different.

19. A communication device, comprising: a memory and a processor;

wherein the memory is configured to store program instructions;

the processor is configured to call the program instructions to execute the data transmission method according to claim 12.

20. A non-transitory computer readable storage medium, wherein a computer program is stored on the storage medium, when the computer program is executed, the data transmission method according to claim 12.

* * * * *